United States Patent
Davidovici et al.

(10) Patent No.: US 6,304,592 B1
(45) Date of Patent: Oct. 16, 2001

(54) COHERENT DETECTION USING MATCHED FILTER ENHANCED SPREAD SPECTRUM DEMODULATION

(75) Inventors: Sorin Davidovici, Jackson Heights, NY (US); Emmanuel Kanterakis, North Brunswick, NJ (US); Donald L. Schilling, Sand Points, NY (US)

(73) Assignee: Golden Bridge Technology, Inc., West Long Branch, NJ (US)

( * ) Notice: Subject to any disclaimer, the term of this patent is extended or adjusted under 35 U.S.C. 154(b) by 0 days.

(21) Appl. No.: 09/605,508

(22) Filed: Jun. 28, 2000

Related U.S. Application Data

(63) Continuation of application No. 08/842,527, filed on Apr. 7, 1997, now Pat. No. 6,154,483.

(51) Int. Cl.[7] ........................................ H04K 1/00
(52) U.S. Cl. ........................................ 375/152
(58) Field of Search .................... 375/130, 147, 375/152, 149, 326, 261, 340, 376, 279, 280, 281, 329, 332; 329/307, 308

(56) References Cited

U.S. PATENT DOCUMENTS

| | | | |
|---|---|---|---|
| 4,291,409 | * 9/1981 | Scales | 375/347 |
| 4,494,238 | 1/1985 | Groth, Jr. . | |
| 4,583,048 | 4/1986 | Gumacos et al. . | |
| 4,621,365 | 11/1986 | Chiu . | |
| 4,841,545 | 6/1989 | Endo et al. . | |
| 4,860,307 | 8/1989 | Nakayama . | |
| 4,969,159 | 11/1990 | Belcher et al. . | |
| 5,031,192 | 7/1991 | Clark . | |
| 5,177,765 | 1/1993 | Holland et al. . | |
| 5,311,544 | 5/1994 | Park et al. . | |
| 5,535,278 | 7/1996 | Cahn et al. . | |
| 5,550,869 | 8/1996 | Gurantz et al. . | |
| 5,619,524 | 4/1997 | Ling et al. . | |
| 5,687,190 | * 11/1997 | Tsao | 375/142 |
| 5,715,276 | * 2/1998 | Tran et al. | 375/152 |
| 5,742,637 | * 4/1998 | Davidovici | 375/147 |
| 5,764,691 | * 6/1998 | Davidovici | 375/152 |
| 5,802,102 | * 9/1998 | Davidovici | 375/152 |
| 5,864,578 | * 1/1999 | Yuen | 375/143 |
| 5,872,808 | * 2/1999 | Kanterakis | 375/152 |
| 5,933,447 | * 8/1999 | Davidovici | 375/152 |
| 5,956,375 | * 9/1999 | Kanterakis | 375/326 |
| 5,999,562 | * 12/1999 | Hennedy | 375/343 |
| 6,215,811 | * 4/2001 | Yuen | 375/143 |

* cited by examiner

*Primary Examiner*—Tesfaldet Bocure
(74) *Attorney, Agent, or Firm*—David Newman Chartered

(57) ABSTRACT

A spread-spectrum-phase-locked-loop apparatus and method for coherent detection without a pilot channel. The system comprises symbol-matched means, a voltage-controlled oscillator (VCO), a first product device, a second product device, a third product device, a fourth product device, a first combiner, a second combiner, and a fifth product device. The method comprises the steps of despreading, from a received spread-spectrum signal, an in-phase component and a quadrature-phase component of a symbol sequence signal using the symbol-matched means. The first and second product devices multiply the despread in-phase component by the VCO-cosine and the VCO-sine signals, respectively, to generate a first and a second product signal. The third and fourth product devices multiply the despread quadrature-phase component by the VCO-sine and the VCO-cosine signals, respectively, to generate a third and a fourth product signal. The first combiner combines the first and third product signals to generate a first combined signal. The second combiner combines the second and fourth product signals to generate a second combined signal. The fifth product device multiplies the first and second combined signals to generate an error signal, responsive to which the VCO adjusts the sine and cosine signal levels.

3 Claims, 13 Drawing Sheets

COHERENT DETECTION USING MATCHED FILTER ENHANCED SPREAD SPECTRUM DEMODULATION

This patent stems from a continuation application of U.S. patent application Ser. No. 08/842,527, filed Apr. 7, 1997, entitled COHERENT DETECTION USING MATCHED FILTER ENHANCED SPREAD SPECTRUM DEMODULATION, issued on Nov. 28, 2000 as U.S. Pat. No. 6,154,483. The benefit of the earlier filing date of the parent patent application is claimed for common subject matter pursuant to 35 U.S.C. 120.

BACKGROUND OF THE INVENTION

This invention relates to spread spectrum communications, and more particularly to a matched filter and a phase-locked-loop circuit which can be used for synchronizing to, and despreading of, a direct sequence, spread-spectrum signal.

DESCRIPTION OF THE RELEVANT ART

Spread-spectrum communications require that an incoming spreading chip-sequence signal embedded in a spread-spectrum signal, and the local spreading chip sequence signal at a receiver, be phase synchronized prior to processing of information transfer. Phase synchronization of the spreading chip sequence signal is commonly known as code acquisition. Code acquisition is one of the most difficult issues facing the system designer.

Code acquisition is followed by the tracking process. Due to imperfect frequency references, the incoming spreading chip sequence signal and the local spreading chip sequence signal tend to lose phase synchronization. Retaining the phase synchronization, or tracking, is a difficult process that typically employs feedback loops.

Conventional spread-spectrum systems implemented without the benefit of a matched filter employ additional circuits, such as delay locked loops (DLLs), dedicated to achieving and sustaining fine-grain-phase synchronization between the local spreading chip-sequence signal and the incoming spreading chip-sequence signal to within a unit of time which is much less than the duration of one chip. The circuits for sustaining fine-grain-phase synchronization are difficult to design and implement.

In wireless environments, minimizing the performance degradation due to long or short duration attenuation of the incoming signal caused by changing propagation channel conditions is highly desirable. As the quality of the channel degrades, the quality of the detected signal degrades, often below acceptable levels.

Typical systems combat this condition by employing any of a variety of techniques collectively known as diversity processing. The diversity processing techniques have in common the ability to independently manipulate the information received through separate propagation paths or channels. The benefit derived from diversity processing is that when a given propagation channel degrades, the information can be recovered from signals received via other channels. A common, though suboptimum, diversity technique is to employ two or more separate antennas and process the signal via two or more processing chains in parallel. Although necessary, the use of two or more antennas and dual processing is a difficult and costly undertaking, requiring two or more times the number of circuits required for one path as well as additional circuits and processing for insuring that the individual channel outputs are synchronized.

A better approach is to employ a wideband signal of bandwidth W. If the multipath spread were $T_M$ then the receiver can recover $L=T_M(W+1)$ replicas of the incoming signal. If the receiver properly processes the replicas, then the receiver attains the performance of an equivalent $L^{th}$ order diversity communication system. For wideband systems the value of L can become very large and it becomes unfeasible to implement L processing paths. Thus a non-matched-filter spread spectrum receiver cannot attain the best possible performance.

The coherent demodulation of information signals requires that the phase of the carrier, at the radio frequency (RF), intermediate frequency (IF) or other frequency at which the demodulation is to take place, be known. The extraction of the phase of the carrier information requires that additional feedback loops be employed, such as phase-locked loops (PLLS), Costas loops, $n^{th}$ power loops or other devices capable of extracting the carrier phase information. In the wireless environment, where signals propagate through a multitude of separate and independent channels, each path processed by the receiver requires its own carrier phase information and therefore its own means to extract it. This requirement greatly increases the potential complexity of the system. The need to limit system complexity acts so as to limit the system performance.

Conventional receivers, for spread-spectrum reception or other coherent systems, employ circuits dedicated to extracting the carrier phase. These techniques, e.g., phase-locked loops (PLLs), Costas loops, $n^{th}$ power loops, etc., exhibit design and implementation complexities that are well documented throughout the professional literature. A separate and independent set of these circuits is implemented for each individual signal path, or channel, that is received. Practical limits on system complexity force the system to receive a small subset of the $L=T_M(W+1)$ independent signal replicas.

A complex matched filter consists of two identical branches, in-phase (I) and quadrature-phase (Q), used to process in-phase and quadrature-phase signals. Each branch has a local signal reference register, an incoming signal register, a multiplication layer and an adder tree. The multiplication layer and the adder tree contained in the in-phase and quadrature-phase branches are identical and may contain the majority of the gates used to implement the matched filter. To implement a matched filter it is preferable to reduce the size of the structure as much as possible.

Processing multiple signals, whether quadrature-phase-shift keying (QPSK) or binary-phase-shift keying (BPSK) modulated, simultaneously by matched filtering is desirable. An example of a requirement for processing multiple signals is the simultaneous matched filter processing of the I & Q components of the BPSK or QPSK spread-spectrum signal and then the combining of such signals. This normally requires the implementation of two or more matched filter structures, one per signal. Matched filters are large, costly and often difficult structures to build. Thus, limiting the size and complexity of the devices as much as possible is desirable.

SUMMARY OF THE INVENTION

A general object of the invention is a matched filter and phase-locked-loop circuit for use with a spread-spectrum receiver which does not require the use of a pilot channel for synchronization.

Another object of the invention is a matched filter and phase-locked-loop circuit for use with a spread-spectrum receiver which can maintain synchronization in spite of channel fading.

According to the present invention, as embodied and broadly described herein, a spread-spectrum, phase-locked-loop apparatus is provided comprising symbol-matched means, a voltage-controlled oscillator, a first product device, a second product device, a third product device, a fourth product device, a fifth product device, a first combiner, and a second combiner. The symbol-matched means may include an in-phase portion and a quadrature-phase portion, and may be embodied as an in-phase-symbol-matched filter and a quadrature-phase-symbol-matched filter, respectively. Alternatively, the symbol-matched means may be embodied as a matched filter which is time shared between the in-phase signals and the quadrature-phase signals.

The spread-spectrum-phase-locked loop apparatus can be used as part of a spread-spectrum receiver, for receiving a received-spread-spectrum signal. A received-spread-spectrum signal, as used herein, is a spread-spectrum signal arriving at the input of the spread-spectrum receiver. The received-spread-spectrum signal is assumed to include a plurality of packets, although the invention alternatively may be used with a continuous spread-spectrum signal having frames or blocks, with each frame or block having a header. Each packet has a header followed in time by data. The header and data are sent as a packet, and the timing for the data in the packet is keyed from the header. The data may contain information such as digitized voice, signalling, adaptive power control (APC), cyclic-redundancy-check (CRC) code, etc.

A symbol-sequence signal is assumed to include a header and data. The header portion of the symbol-sequence signal is denoted herein as a header-symbol-sequence signal. The data portion of the symbol-sequence signal is denoted herein as the data-symbol-sequence signal.

The header, or preamble, is generated from spread-spectrum processing a header-symbol-sequence signal with a chip-sequence signal. The data part of the packet is generated from spread-spectrum processing a data-symbol-sequence signal with the chip-sequence signal. The chip-sequence signal for spread-spectrum processing the header-symbol-sequence signal and the data-symbol-sequence signal are preferably, but do not have to be the same.

The symbol-matched means has an in-phase-symbol-impulse response matched to the chip-sequence signal and a quadrature-phase-symbol-impulse response matched to the chip-sequence signal. The symbol-matched means despreads from the received-spread-spectrum signal, an in-phase component as a despread-in-phase component of a symbol-sequence signal, and a quadrature-phase component as a despread-quadrature-phase component of the symbol-sequence signal.

The voltage-controlled oscillator (VCO) generates a VCO-sine signal and a VCO-cosine signal. The VCO-cosine signal has a phase which is 90° from the VCO-sine signal.

The first product device multiplies the despread-in-phase component of the symbol-sequence signal, by the VCO-cosine signal, to generate a first product signal. The second product device multiplies the despread-in-phase component of the symbol-sequence signal, by the VCO-sine signal to generate a second product signal. The third product device multiplies the despread-quadrature-phase component of the symbol-sequence signal, by the VCO-sine signal, to generate a third product signal. The fourth product device multiplies the despread-quadrature-phase component of the symbol-sequence signal by the VCO-cosine signal, thereby generating a fourth product signal.

The first combiner combines the first product signal with the third product signal, to generate a first combined signal. The second combiner combines the second product signal with the fourth product signal, to generate a second combined signal. The fifth product device multiplies the first combined signal by the second combined signal to generate an error signal. In response to the error signal, the voltage-controlled oscillator adjusts a level of the VCO-sine signal and a level of the VCO-cosine signal.

An alternative embodiment of the present invention also includes a spread-spectrum-phase-locked-loop method, for use as part of a spread-spectrum receiver on the received-spread-spectrum signal. The received spread-spectrum signal is generated from spread-spectrum processing a symbol-sequence signal with a chip-sequence signal. The method comprises the steps of despreading, from the received-spread-spectrum signal, an in-phase component as a despread-in-phase component of the symbol-sequence signal, and despreading, from the received-spread-spectrum signal, a quadrature-phase component as a despread quadrature-phase component of the symbol-sequence signal. The method further includes generating from a voltage-controlled-oscillator (VCO), a VCO-sine signal and a VCO-cosine signal. The VCO-cosine signal has a phase relationship which is 90° from the VCO-sine signal.

The despread-in-phase component of the symbol-sequence signal is multiplied by the VCO-cosine signal, to generate a first product signal. The despread-in-phase component of the symbol-sequence signal is multiplied by the VCO-sine signal, to generate a second product signal. The despread-quadrature-phase component of the symbol-sequence signal is multiplied by the VCO-sine signal, to generate a third product signal. The despread-quadrature-phase component of the symbol-sequence signal is multiplied by the VCO-cosine signal, to generate a fourth product signal. The first product signal is combined with the third product signal to generate a first combined signal, and the second product signal is combined with the fourth product signal to generate a second combined signal. The method further includes multiplying the first combined signal by the second combined signal to generate an error signal, and adjusting, in response to the error signal, a level of the VCO-sine signal and a level of the VCO-cosine signal.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Figure 1:
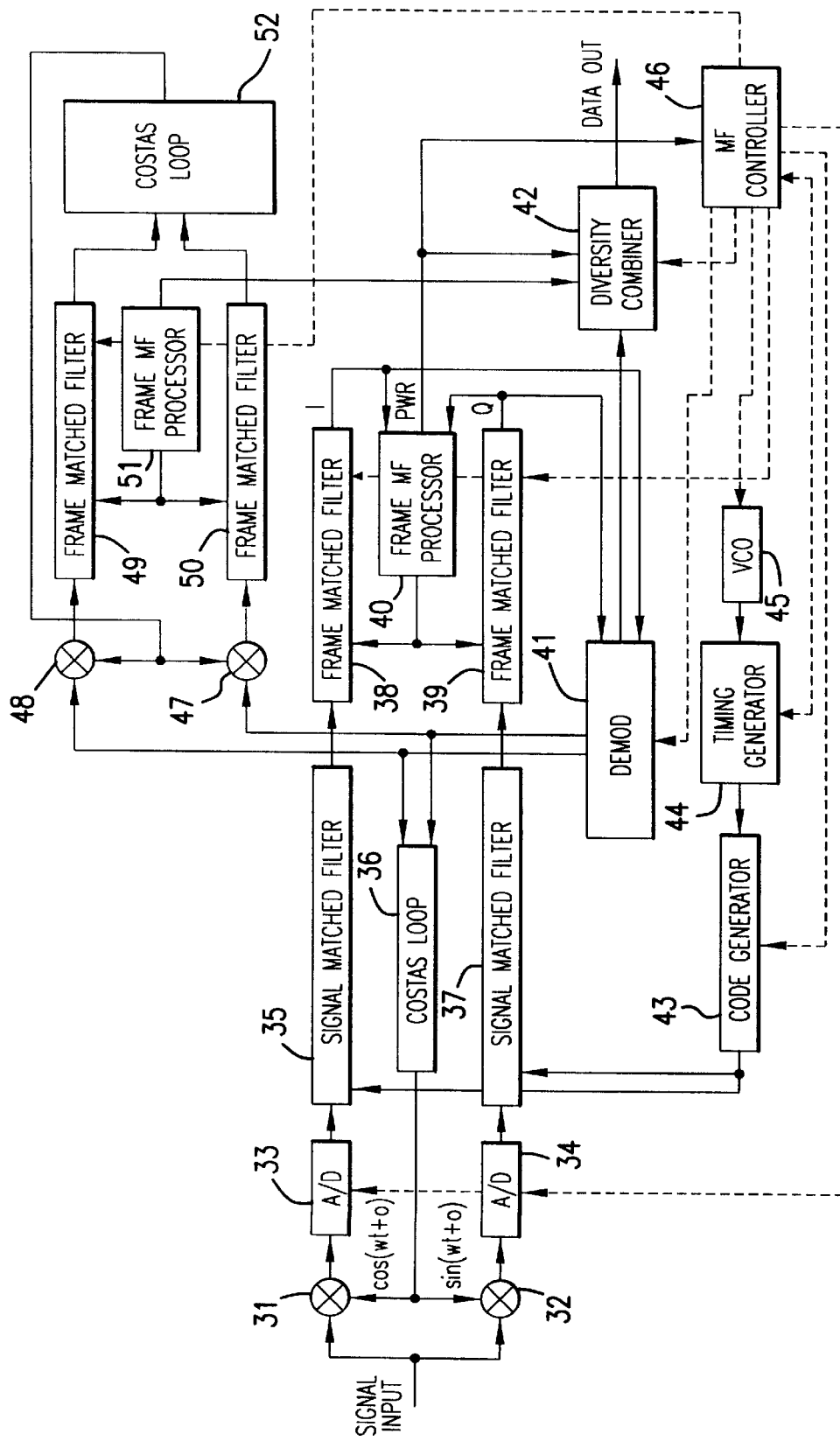
FIG. 1 is a block diagram of a signal-time-sharing, matched-filter-based demodulator.

Reference now is made in detail to the present preferred embodiments of the invention, examples of which are illustrated in the accompanying drawings, wherein like reference numerals indicate like elements throughout the several views.

The present invention provides a new and novel spread-spectrum-matched-filter apparatus and phase-locked-loop (PLL) apparatus which can be used as part of a spread-spectrum receiver on a received-spread-spectrum signal. The received-spread-spectrum signal is assumed to include a plurality of packets. Continuous, non-packeted spread-spectrum signals also may be used with the phase-locked loop apparatus. A header type of sequence would have to occur periodically in the continuous spread-spectrum signal, from which timing may be triggered. The latter embodiment might be referred to as a data block with a header, and is equivalent to the packet with header as discussed herein. Hereinafter, the discussion refers to the packet and header, with the understanding that other embodiments are equivalent.

Each packet has a header followed in time by data. The header is generated from spread-spectrum processing, by using techniques well known in the art, a header-symbol-sequence signal with a chip-sequence signal. The header-symbol-sequence signal is a predefined sequence of symbols. The header-symbol-sequence signal may be a constant value, i.e., just a series of 1-bits or symbols, or a series of 0-bits or symbols, or alternating 1-bits and 0-bits or alternating symbols, a pseudorandom symbol sequence, or other predefined sequence as desired. The chip-sequence signal is user defined, and in a usual practice, is used with a header-symbol-sequence signal. The header indicates the start of data, aids in acquisition and reacquisition, and helps provide phase reference between multipaths for diversity combining such as RAKE.

The data part of the spread-spectrum packet is generated similarly, from techniques well known in the art as used for the header, by spread-spectrum processing a data-symbol-sequence signal with the chip-sequence signal. The data-symbol-sequence signal may be derived from data, or an analog signal converted to data, signalling information, or other source of data symbols or bits. The chip-sequence signal can be user defined, and preferably is nearly orthogonal to other spread-spectrum channels using a chip-sequence signal, as is well known in the art.

The matched filter aspect of the invention is discussed initially, followed by a discussion on the phase-locked-loop apparatus.

Matched Filter

Broadly, the spread-spectrum-matched-filter apparatus includes code means, symbol-matched means, frame-matched means, control means, and demodulator means. The control means is coupled to the code means and symbol-matched means. The frame-matched means is coupled to the output of the symbol-matched means. The demodulator means is coupled to the output of the symbol-matched means.

The code means generates a replica of the chip-sequence signal. The replica of the chip-sequence signal is the same sequence as used for generating, at a spread-spectrum transmitter, the received-spread-spectrum signal which arrives at the input of the spread-spectrum-matched-filter apparatus. The code means can change, over time, the particular chipping sequence from which the replica of the chip-sequence signal is generated. Accordingly, the spread-spectrum-matched-filter apparatus can be used for a variety of chip-sequence signals as generated by the code means, as might be used in a cellular-spread-spectrum architecture where a receiver might move from one geographical area to another. As the spread-spectrum-matched-filter apparatus moves from one geographical area to another, by way of example, a requirement might be imposed to change the chip-sequence signal in each of the different geographical areas. Similarly, each transmitter within the geographical area of a base station may have a different chip-code sequence.

The symbol-matched means has a symbol-impulse response. The prefix "symbol" is used to denote those means or components which operate on detecting or processing a data or header symbol from the received-spread-spectrum signal. The symbol-impulse response can be set from the replica of the chip-sequence signal generated by the code means. Thus, the symbol-impulse response may be set for filtering from the received-spread-spectrum signal, the header and the data-symbol-sequence signal. With the symbol-impulse response set to the replica of the chip-sequence signal, and with the header portion of the received-spread-spectrum-signal being present at the receiver, the symbol-matched means outputs a despread-header-symbol-sequence signal. Upon detecting the despread-header-symbol sequence, the frame-matched means outputs a high level signal which may be used as a start-data signal. Other uses may be to synchronize the sequence of transmit, switching and receive cycles or to generate a timing signal for any other event that is related in time to the header.

The symbol-matched means continues to have the symbol-impulse response set from the replica of the chip-sequence signal. When the data portion of the received-spread-spectrum signal is present at the receiver, the symbol-matched means filters the received-spread-spectrum signal. Timing to sample the data portion of the received-spread-spectrum signal is triggered from the start-data signal. Thus, the symbol-matched means outputs the despread-data-symbol-sequence signal. Accordingly, the symbol-matched means can despread the header and the data portion of the received-spread-spectrum signal.

The frame-matched means has a frame-impulse response matched to the header-symbol-sequence signal. Thus, the frame-matched means filters the despread-header-symbol-sequence signal from the symbol-matched means, and generates as a result thereof, a start-data signal when the despread-header-symbol-sequence signal matches the frame-impulse response. The frame-matched means may be programmable, i.e., have a programmable frame-impulse response, which might change between different geographical areas.

The control means controls the setting of the symbol-impulse response of the symbol-matched means. The control means can dynamically set the symbol-matched means, by using the replica of the chip-sequence signal generated by the code means, to match the chip-sequence signal embedded in the received-spread-spectrum signal.

The symbol-matched means may include an in-phase-symbol-matched means and a quadrature-phase-symbol-matched means. The in-phase-symbol-matched means has an in-phase-symbol-impulse response which can be set from the replica of the chip-sequence signal generated by the code means. Depending on which setting the in-phase-symbol-matched means has, the in-phase-symbol-matched means despreads from the received-spread-spectrum signal, an in-phase-component of the header portion of the packet as a despread-in-phase-component of the header-symbol-sequence signal, or an in-phase component of the data portion of the packet as a despread-in-phase component of the data-symbol-sequence signal.

The quadrature-phase-symbol-matched means has a quadrature-impulse response which can be set from the replica of the chip-sequence signal generated by the code means. When the quadrature-phase-symbol-matched means has the quadrature-impulse response matched to the chip-sequence signal, the quadrature-phase-symbol-matched means despreads from the received-spread-spectrum signal a quadrature-phase component of the header portion of the packet as a despread-quadrature-phase component of the header-symbol-sequence signal. Similarly, when the quadrature-phase-symbol-matched means has the quadrature-symbol-impulse response set from the replica of the chip-sequence signal, the quadrature-phase-symbol-matched means despreads the received-spread-spectrum signal as a quadrature-component of the data portion of the packet as a despread-quadrature-phase component of the despread data-symbol-sequence.

In use, the control means sets the in-phase-symbol-matched means and the quadrature-phase-symbol-matched means matched to detect the chip-sequence signal. The in-phase-symbol-matched means and the quadrature-phase-symbol-matched means are matched simultaneously, and preferably are matched to the same chip-sequence signal.

The frame-matched means may include an in-phase-frame-matched means and a quadrature-phase-frame-matched means. The in-phase-frame-matched means has an in-phase-frame-impulse response matched to an in-phase component of the header-symbol-sequence signal. When the in-phase component of the despread-header-symbol-sequence signal from the in-phase-symbol-matched means matches the in-phase-frame-impulse response, then an in-phase-start-data signal is generated.

The quadrature-phase-frame-matched means has a quadrature-phase-frame-impulse response matched to a quadrature-phase component of the header-symbol-sequence signal. When the quadrature-phase component of the despread-header-symbol-sequence signal matches the quadrature-phase-frame-impulse response of the quadrature-phase-frame-matched means, then a quadrature-phase-start-data signal is generated. In practice, the in-phase-start-data signal and the quadrature-phase-start-data signal are generated simultaneously, buy they may also occur at different times.

The in-phase-start-data signal and the quadrature-phase-start data signal are combined as the start-data signal. Timing for sampling the output of the in-phase-symbol-matched means and the quadrature-phase-symbol-matched means for detecting the data-symbol-sequence signal is triggered, at a time delay, from the start-data signal. The time delay may be zero.

In the exemplary arrangement shown in FIG. 1, the code means is embodied as a code generator 43, the symbol-matched means is embodied as an in-phase-symbol-matched filter 35 and a quadrature-phase symbol-matched filter 37, the frame-matched means is embodied as an in-phase-frame-matched filter 38 and a quadrature-phase-frame-matched filter 39, the control means is embodied as a controller 46, and the demodulator means is embodied as a demodulator 41. The in-phase-symbol-matched filter 35 and the quadrature-phase-symbol-matched filter 37 may be constructed as digital-matched filters, surface-acoustic-wave devices, or as software embedded in a processor or as an application specific integrated circuit (ASIC). Also shown is a voltage-controlled oscillator 45, timing generator 44, diversity combiner 42, frame processor 40, Costas loop 36 or other generic tracking loop, in-phase analog-to-digital converter 33, quadrature-phase analog-to-digital converter 34, in-phase mixer 31, and quadrature-phase mixer 32.

The in-phase analog-to-digital converter 33 is coupled between in-phase mixer 31 and in-phase-symbol-matched filter 35. The quadrature-phase analog-to-digital converter 34 is coupled between the quadrature-phase mixer 32 and the quadrature-phase-symbol-matched filter 37. The Costas loop 36 is coupled to the output of the in-phase-symbol-matched filter 35, to the output of the quadrature-phase-symbol-matched filter 37, and to the in-phase mixer 31 and the quadrature-phase mixer 32. The in-phase-frame-matched filter 38 is coupled between the in-phase-symbol-matched filter 35 and the frame processor 40 and the demodulator 41. The quadrature-phase-frame-matched filter 39 is coupled between the quadrature-phase-symbol-matched filter 37 and the processor 40 and the demodulator 41. The code generator 43 is coupled between the timing generator 44 and the in-phase-symbol-matched filter 35 and the quadrature-phase-frame-matched filter 37. The timing control circuit controls the sampling instant of the analog-to-digital converter timing generator 44 to the in-phase-symbol-matched filter 35 and the quadrature-phase-symbol-matched filter 37. The voltage-controlled oscillator 45 is coupled to the timing generator 44 and to the matched-filter controller 46. The diversity combiner 42 is coupled to the frame processor 40 and the demodulator 41. The controller 415 is coupled to the frame processor 40. The prefixes in-phase and "quadrature-phase" denote that component, i.e., in-phase or quadrature-phase, of the received-spread-spectrum signal, with which the element operates.

The in-phase analog-to-digital converter 33 and the quadrature-phase analog-to-digital converter 34 may be embodied as a hard limiter which performs one-bit analog-to-digital conversion, or as an N-bit analog-to-digital converter. Analog-to-digital converters are well known in the art.

For control, indicated by broken lines, the controller 46 is coupled to the diversity combiner 42, the frame-matched filter 38, the frame-matched filter 39, the demodulator 41, the timing generator 44, the code generator 43, the in-phase-analog-to-digital converter 33, and the quadrature-phase-analog-to-digital digital converter 34. The diversity combiner 42 may only process one signal.

For RAKE applications, additional sections of frame-matched filters would be required. Thus, an additional in-phase mixer 48 and quadrature-phase mixer 47, and in-phase-frame-matched. filter 49 and quadrature-phaseframe-matched filter 50 would be used with a second frame-matched-filter processor 51 and Costas loop 52. The application RAKE is well known in the art, and thus the addition of the additional frame-matched filter section would be easily recognizable to those skilled in the art.

Referring to FIG. 1, a received-spread-spectrum signal at the signal input is translated to an intermediate frequency or baseband frequency by in-phase mixer 31 and quadrature-phase mixer 32. For discussion purposes, the received-spread-spectrum signal is assumed to be translated to a baseband frequency. The portion of the spread-spectrum receiver which includes low noise amplifiers, automatic-gain-control (AGC) circuits, filters, etc., is well known in the art, and therefore, is not shown. The baseband received-spread-spectrum signal is converted to a digital signal by in-phase analog-to-digital converter 33 and quadrature-phase analog-to-digital converter 34. Thus, a baseband version of the received-spread-spectrum signal is at the input of the in-phase-symbol-matched filter 35 and the quadrature-phase-symbol-matched filter 37.

The in-phase-symbol-matched filter 35 has an in-phase-symbol-impulse response which is set by the replica of the chip-sequence signal from code generator 43. Depending on the setting, the in-phase-symbol-matched filter 35 can despread the received-spread-spectrum signal as a despread-in-phase component of the header-symbol-sequence signal or as a despread-in-phase component of the spread-spectrum-processed data-symbol-sequence signal. Accordingly, the in-phase-symbol-matched filter 35 outputs either a despread-in-phase component of the header-symbol-sequence signal, or a despread-in-phase component of the spread-spectrum-processed data-symbol-sequence signal as a despread-in-phase-data-symbol-sequence signal.

Similarly, the quadrature-phase-symbol-matched filter 37 has a symbol-impulse response which can be set by the replica of the chip-sequence signal generated by the code generator 43., Depending on the setting, the quadrature-phase-symbol-matched filter 37 despreads the received-spread-spectrum signal as a quadrature-phase component of the header-symbol-sequence signal or as a quadrature-phase component of the spread-spectrum-processed data-symbol-sequence signal. Accordingly, the output of the quadrature-phase-symbol-matched filter 37 is either a despread-quadrature-phase component of the header-symbol-sequence signal or a despread-quadrature-phase component of the spread-spectrum-processed data-symbol-sequence signal as a despread-quadrature-phase-data-symbol-sequence signal.

The in-phase-symbol-matched filter 35 and the quadrature-phase-symbol-matched filter 37 are ultimately controlled by the controller 46. The controller 46 controls timing and determines at desired timings when the code generator 43 sets the symbol-impulse responses of the in-phase-symbol-matched filter 35 and the quadrature-phase-symbol-matched filter 37 to the respective chip-sequence signal being used in a particular geographic area.

Figure 2:
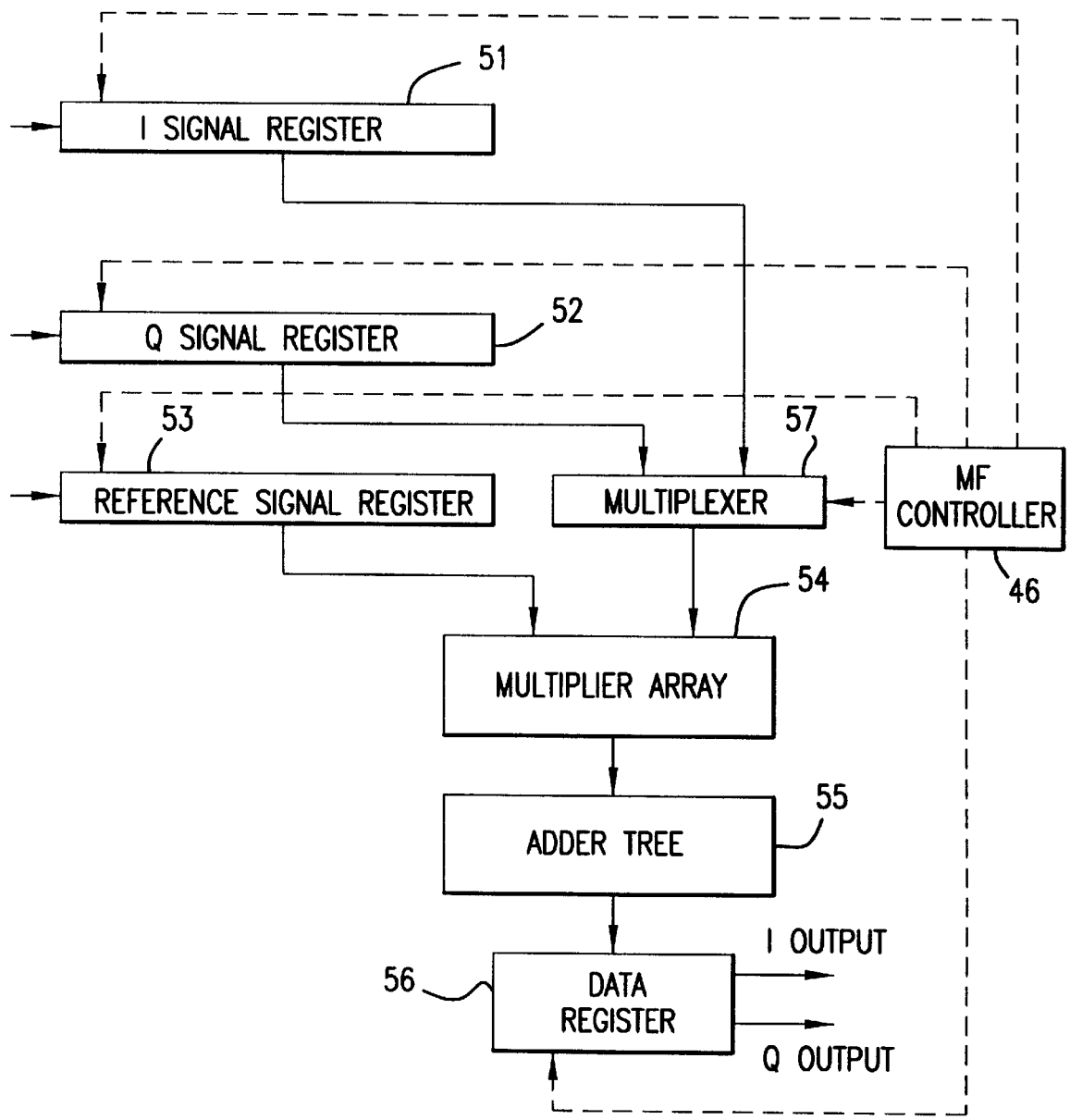
FIG. 2 illustrates a matched filter using time sharing of multiplier array and adder tree.

As shown in FIG. 2, the controller 46 controls the in-phase signal register 51 and the quadrature-phase signal register 52, which correspond to the in-phase-symbol-matched filter 35 and the quadrature-phase-symbol-matched filter 37, respectively.

In FIG. 1, the Costas loop 36 uses the output from the in-phase-symbol-matched filter 35 and the output from the quadrature-phase-symbol-matched filter 37 to generate the cosine signal and sine signal for in-phase mixer 31 and quadrature-phase mixer 32, respectively.

The spread-spectrum receiver receives packets of header and data, which may arrive as a stream of uninterrupted packets in a frequency division duplex (FDD) application, or as separate packets in a time division duplex (TDD) application. The despread and detected header provides timing and synchronization for data within a respective packet.

Figure 3:
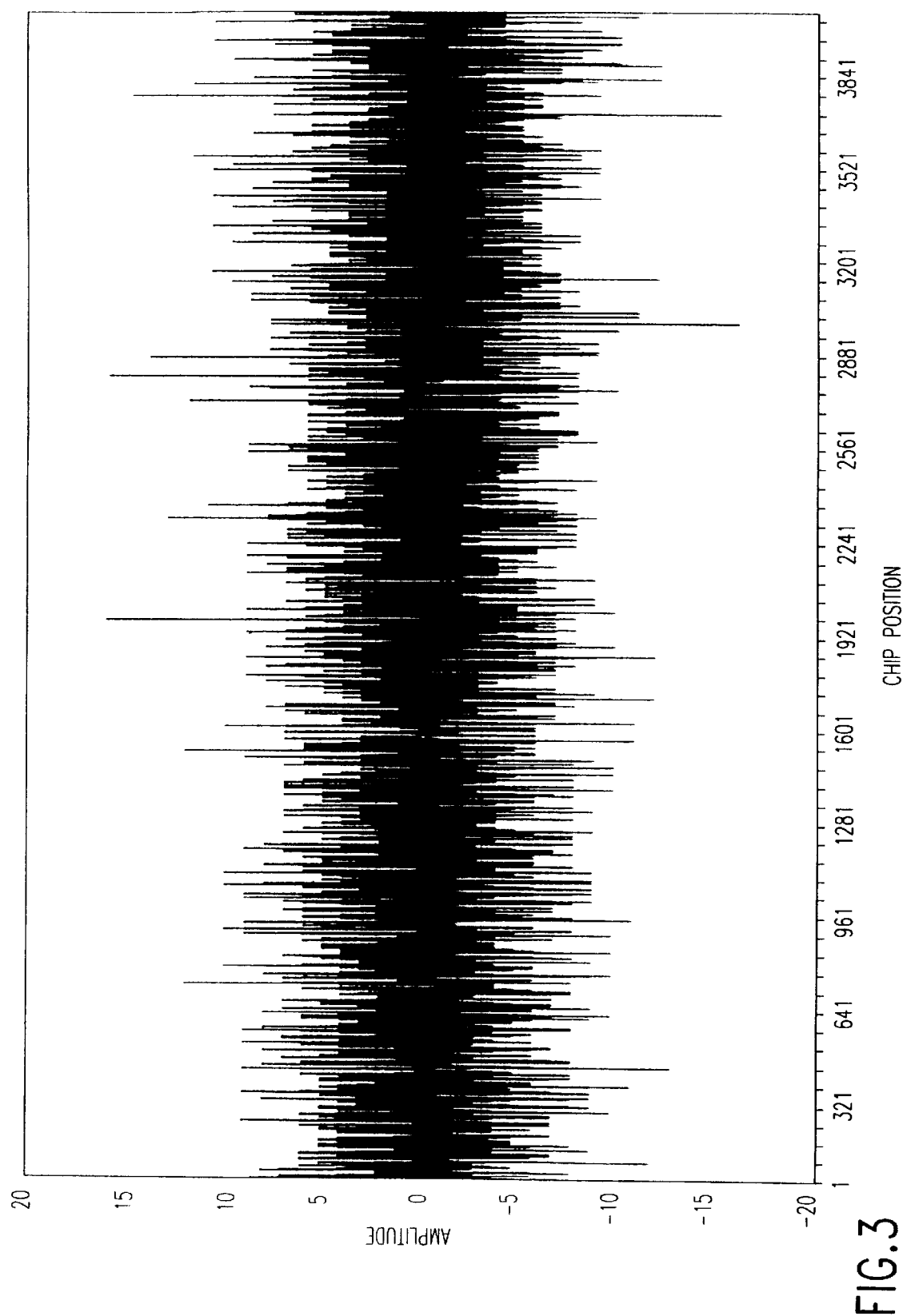
FIG. 3 is an example output signal from the symbol-matched filter.
Figure 4:
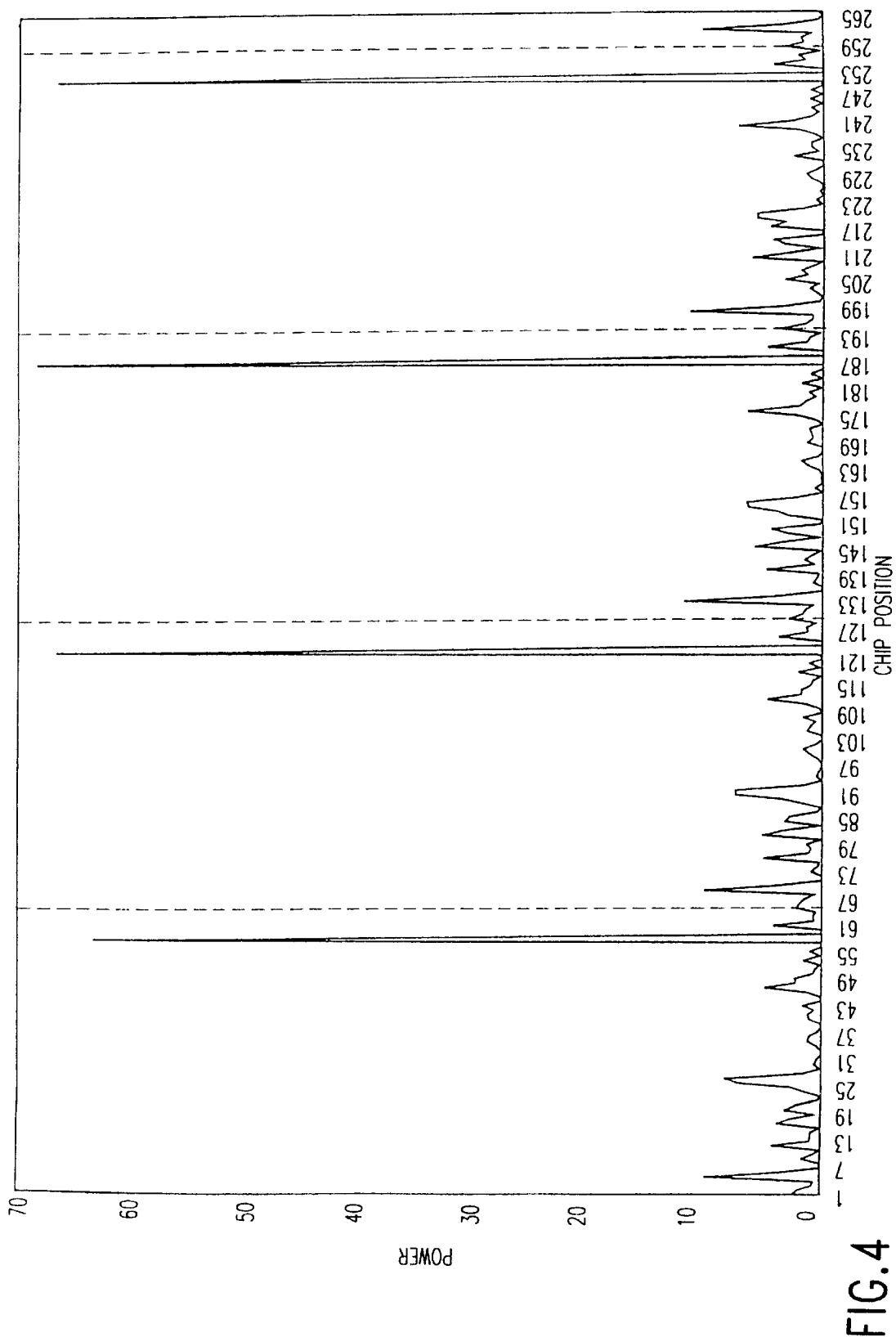
FIG. 4 is an example output signal from the frame-matched filter.

When the in-phase-symbol-matched filter 35 and quadrature-phase-symbol-matched filter 37 have their respective symbol-impulse responses matched to the chip-sequence signal, and the header portion of the packet of the received-spread-spectrum signal is present at the receiver input, then the output is a despread-header-symbol-sequence signal. An example of a signal outputted from the symbol-matched filter as a despread-header-symbol-sequence signal is illustrated in FIG. 3. The despread-header-symbol-sequence signal is passed through in-phase-frame-matched filter 38 and quadrature-phase-frame-matched filter 39. The in-phase-frame-matched filter 38 has an in-phase-frame-impulse response matched to the in-phase component of the header-symbol-sequence signal, and accordingly, generates an in-phase-start-data signal when the in-phase component of the despread-header-symbol-sequence signal matches the in-phase-frame-impulse response. Similarly, the quadrature-phase-frame-matched filter 39 has a quadrature-phase-frame-impulse response matched to a quadrature-phase component of the header-symbol-sequence signal. When the despread-header-symbol-sequence signal from the quadrature-phase-symbol-matched filter 37 matches the quadrature-phase-frame-impulse response of the quadrature-phase-matched filter 37, then the quadrature-phase-frame-matched filter outputs a quadrature-phase-start-data signal. An example of a signal outputted from the frame-matched filter is illustrated in FIG. 4. The large spike's, i.e., large signal levels, are the start-data signal referred to herein. These spikes or start-data signals serve as timing references to synchronize timing, as disclosed herein. The in-phase-start-data signal and the quadrature-phase-start-data signal are demodulated by demodulator 41, and can be used as an initial timing signal for controlling when the diversity combiner 42 combines the output from the demodulator 41 for the respective signals from in-phase-symbol-matched filter 35 and the quadrature-phase-symbol-matched filter 37.

Additionally, the en-phase-start-data signal and the quadrature-phase-start-data signal can be processed by frame processor 40 to trigger a timing signal, i.e., the start-data signal, to the controller 46 which actuates the timing for when to sample the outputs of the in-phase-symbol-matched filter 35 and the quadrature-phase-symbol-matched filter 37, for detecting the data-symbol-sequence signal.

In a particular implementation of the present invention, the in-phase-symbol-matched filter 35 and the quadrature-phase-symbol-matched filter 37 have their respective in-phase-symbol-impulse response and quadrature-phase-symbol-impulse response determined, under the control of the controller 46, such that they are matched to the chip-sequence signal within 6.4 microseconds (64 chips at 10 Mchips/sec). Typically, current designs have these respective symbol-matched filters loaded within 12.8 microseconds, for a system operating at 100 MHz, with each of the in-phase-symbol-matched filter 35 and the quadrature-phase-symbol-matched filter 37 having a 256 stage shift register (256 chips at 20 Mchips/sec).

The demodulator 41 can be implemented using coherent demodulation, or alternatively using noncoherent demodulation.

The diversity combiner 42 combines in a variety of ways, such as maximum likelihood, straight combining, addition, or the demodulated outputs from the in-phase-symbol-matched filter :35 and the quadrature-phase-symbol-matched filter 37 as demodulated through demodulator 41.

FIG. 2 illustrates the matched filter using the time sharing of the multiplier array and adder tree. Shown in FI(G. 2 are in-phase-signal register 51, quadrature-phase-signal register 52, reference-signal register 53, multiplier array 54, adder tree 55, data register 56, and controller 46. As shown, the dotted lines indicate that the controller 46 provides the necessary controlling of the in-phase-signal register 51, the quadrature-phase-signal register 52, the reference-signal reference 53 and the data register 56. The solid lines indicate the signal flow from the in-phase-signal register 51, the quadrature-phase-signal register 52, the reference-signal register 53 through the multiplexer 57. The in-phase-signal. register 51 and the quadrature-phase-signal register 52 are coupled through multiplexer 57 to multiplier array 54 to adder tree 55 to data register 56. The data register 56 has an in-phase output and quadrature-phase output.

The present invention also includes a method which uses a symbol-matched filter and a frame-matched filter with a spread-spectrum receiver on a received-spread-spectrum signal. As with the apparatus previously disclosed, the received-spread-spectrum signal is assumed to have a plurality of packets, with each packet including a header and data portion. The header is generated from spread-spectrum processing a header-symbol-sequence signal with a chip-sequence signal. The data portion of the packet is generated from spread-spectrum processing a data-symbol-sequence signal with the chip-sequence signal.

The method comprises the steps of generating a replica of the chip-sequence signal. The method programs the symbol-matched filter with the replica of the chip-sequence signal to set the symbol-matched filter to have a symbol-impulse response matched to the chip-sequence signal. With the symbol-matched filter matched to the chip-sequence signal, the method despreads the header portion of the packet from the received-spread-spectrum signal as a despread header-symbol-sequence signal.

The frame-matched filter has a frame-impulse response matched to the header-symbol-sequence signal. The method therefore uses the frame-matched filter to filter the despread header-symbol-sequence signal. The method thereafter generates from the filtered despread-header-symbol-sequence signal, the data-start signal in response to the despread-header-symbol-sequence signal matching the frame-impulse response of the frame-matched filter.

The method also generates at a time delay from the data-start signal, a data-control signal. The time delay may be zero. In response to the data-control signal, the method programs the frame-matched filter with the replica of the data-chip-sequence signal so that the frame-matched filter has the frame-impulse response matched to the data-symbol-sequence signal. The method thereby despreads, while the frame-matched filter is matched to the data-symbol-sequence signal, the data-spread-spectrum channel from the received-spread-spectrum signal as a despread-data-symbol-sequence signal.

The method as described herein may be extended to in-phase and quadrature-phase components of a received-spread-spectrum signal. As such, the method would have the step of despreading the header portion of the packet from the received-spread-spectrum signal including the steps of despreading, from the received-spread-spectrum signal, the in-phase component of the header as a despread in-phase component of the header-symbol-sequence signal, and despreading, from the received-spread-spectrum signal, the quadrature-phase component of the header as a despread-quadrature-phase component of the header-symbol-sequence signal.

Similarly, the in-phase component and the quadrature-phase component of the received-spread-spectrum signal can be despread as in-phase components and quadrature-phase components of the data-symbol-sequence signal. Accordingly, the method would include despreading, from the received-spread-spectrum signal, an in-phase component of the data portion of the packet as a, despread-in-phase component of the data-symbol-sequence signal. The method would also include despreading a quadrature-phase component of the data portion of the packet as a despread-quadrature-phase component of the data-symbol-sequence signal.

When filtering the despread header-symbol-sequence signal into in-phase components and quadrature-phase components, the method can also include generating an in-phase-start-data signal and a quadrature-phase-start-data signal, in response to the in-phase component and the quadrature-phase component of the despread header-symbol-sequence signal matching the in-phase-frame-impulse response and the quadrature-phase-frame-impulse response, respectively.

In operation, the in-phase-symbol-matched filter 35 and the quadrature-phase-symbol-matched filter 37 are loaded with M local sequence symbols, i.e., the replica of the chip-sequence signal. The incoming received-spread-spectrum-signal samples generated by in-phase-analog-to-digital converter 33 and quadrature-phase-analog-to-digital converter 34, respectively, slide by, i.e. are correlated against, the local replicas until they line up, at which time a large information bearing output is produced. The generation of this large output does not require that a synchronization process be successfully completed a priori or that additional circuits dedicated to the acquisition process be employed and it achieves code synchronization in the shortest possible time to acquire the incoming spreading chip-sequence signal. This has the advantage of lower implementation cost, lower physical volume, reduced power consumption, more rapid implementation and much better performance as measured by the time required to achieve code synchronization.

The presence of a strong signal level output indicates that at that specific moment in time M incoming signal symbols and the M symbols of the local spreading code, i.e., chip-sequence signal, loaded in the in-phase-symbol-matched filter 35 and the quadrature-phase-symbol-matched filter 37 are in alignment. The requirement exists that the in-phase-symbol-matched filter 35 and the quadrature-phase-symbol-matched filter 37 be fully loaded with the next M symbols of the local spreading code, i.e., the chip-sequence signal, at any time prior to the arrival of the next M incoming signal symbols at the in-phase-symbol-matched filter 35 and the quadrature-phase-symbol-matched filter 37. The value of the number M, which denotes the size of the respective symbol-matched filter as measured in number of signal samples, is much larger than any value on the order of one; in an example embodiment, M is on the order of 250. Because M is much larger than one of the circuits required to implement the code, phase synchronization functions are much easier to design and implement. This has the advantage of lower implementation cost, lower physical volume, reduced power consumption, more rapid implementation and inherently better performance.

The in-phase-symbol-matched filter 35 and the quadrature-phase-programmable filter 37 identify, characterize and extract the information which arrives through all available channels, or paths, intrinsically, without any additional and parallel signal processing paths. The spreading code loaded as a local reference in the in-phase-symbol-matched filter 35 and the quadrature-phase-symbol-matched filter 37 remain in place until all propagation channels have the opportunity to deliver the information signal at the in-phase-symbol-matched filter 35 and the quadrature-phase-symbol-matched filter 37; the matched filter can then easily recover all $L=T_M(W+1)$ signals it is capable of receiving. As the input signals are offset in time due to differences in length of the propagation path, and since the in-phase-symbol-matched filter 35 and the quadrature-phase-symbol-matched filter 37 are linear devices, the outputs due to the signals' propagation through different channels are output by the in-phase-symbol-matched filter 35 and the quadrature-phase-symbol-matched filter 37 offset in time. Thus the reception and separation of the signals propagating through different channels does not require any additional circuits and the individual signals, which are now separate in time, can be easily individually manipulated and combined in optimum ways such that the matched filter receiver attains the performance of an L-diversity system.

A receiver capable of identifying, separating and combining large numbers (L) of signal replicas propagating through different channels is a time diversity receiver and is commonly called a RAKE receiver. The RAKE receiver structure can be implemented using the matched filter without the excessive complexity incurred by alternative system implementations. The in-phase-symbol-matched filter 35 and the quadrature-phase-symbol-matched filter 37 implementation of the heart of the diversity processing system has the advantage of lower implementation cost, lower physical volume, reduced power consumption, more rapid implementation, less complex control and better performance.

In contrast, the symbol-matched-filter-based demodulator as described herein utilizes only one such set of circuits and, using information which is intrinsically generated, can then coherently demodulate any number of signal replicas that arrive via separate propagation paths. The mechanism by which this is accomplished is to employ one conventional phase tracking circuit, e.g., phase-locked loop (PLLs), Costas loop, or $n^{th}$ power loop, in order to establish a temporarily stable phase reference and to then extract the phase offset of each individual signal with respect to that phase reference. The incoming signal is first downconverted non-coherently to some frequency, including the 0 Hz frequency (DC). Then the in-phase and quadrature-phase channel outputs are read from the in-phase-symbol-matched filter 35 and the quadrature-phase-symbol-matched filter 37, respectively. The phase offset of the carrier signal is contained in the relative amplitudes of the in-phase and quadrature-phase outputs which are then used directly to demodulate the received data signal. Alternatively the phase estimate on the individual propagation paths can be improved by further matched filtering to demodulate the signal with performance equal to or better than that obtained using conventional coherent demodulators but without the added complexity introduced by conventional coherent demodulators. Therefore the symbol-matched filter-based implementation has the advantage of much lower complexity, lower implementation cost, lower physical volume, reduced power consumption, more rapid implementation and better performance.

A set of multipliers and the associated adder tree may be eliminated. By inputting the signals at the input of the remaining set of multipliers and the associated adder tree from two multiplexers, each multiplexer may serve to connect to the multiplier/adder tree structure either the in-phase or quadrature-phase signal registers. This implementation adds the complexity of two multiplexers and reduces the complexity associated with a set of multipliers and an adder tree for a significant net reduction in complexity.

The symbol-matched filter is a digital signal processor, the output of which is of interest only at that instant in time when the portion of interest of the incoming signal is fully loaded and is of no interest at any other time. In the present implementation the size of the symbol-matched filters is approximately 64 or 256 stages, requiring 64 or 256 clock cycles, respectively, to load the input samples of the received-spread-spectrum signal. The output of the symbol-matched filter is of interest only for one or two clock cycles and is of no interest for the rest of the approximately 248 clock cycles. Thus the circuit can be reused during these 248 clock cycles. Two or more signals, say N signals, can utilize the same matched filter provided that the signals are not lined up in phase and thus the outputs are staggered in time. If N=5 signals shared the same matched filter, then the signals could then be staggered by approximately 45 clock cycles and the matched filter could be operated in a number of ways, including the following manner:

1. Starting at clock cycle 5, the symbol-matched filters are loaded with the reference corresponding to the first signal. The output due to the first signal occur during the $50^{th}$ and $51^{st}$ clock cycle.

2. Starting at clock cycle 55, the symbol-matched filters are loaded with the reference corresponding to the second signal. The output due to the second signal will occur during the $100^{th}$ and $101^{st}$ clock cycle.

3. Starting at clock cycle 105, the symbol-matched filters are loaded with the reference corresponding to the third signal. The output to the third signal will occur during the $150^{th}$ and $151^{st}$ clock cycle.

4. Starting at clock cycle 155, the symbol-matched filters are loaded with the reference corresponding to the fourth signal. The output due to the fourth signal will occur during the $200^{th}$ and $201^{st}$ clock cycle.

5, starting at clock cycle 205, the symbol-matched filters are loaded with the reference corresponding to the fifth signal. The output due to the fifth signal will occur during the $250^{th}$ and $251^{st}$ clock cycle.

The cycle then repeats itself for the next output due to the first, second, third, fourth and fifth signals using only one matched filter. The complexity of and size of implementation is reduced by 80% while the signal processing benefits remain constant.

Matched Filter Performance

The matched filter is preferred since it can provide significantly faster acquisition than the standard serial-search technique. For example, if the chip rate were $f_c$ and the number of chips that must be searched before accepting or discarding a hypothesis is N and the code length is L, then the "worst-case" acquisition time for serial search is $LN/fc$ while the equivalent matched-filter acquisition time is $L/f_c$. Typically, N is between 1000 and 10,000, so that for a matched filter of length N a significant savings can accrue by using a matched filter.

Until now, matched filters have been restricted to small values of N as a result of the large number of gates needed for matched filter implementation. One aspect of this invention is a novel procedure to implement the matched filter.

One procedure for coherent detection used since the 1940's is to transmit a reference signal in addition to the data bearing signal. In a spread-spectrum system the reference signal, such as a pilot channel, and data signal are both spread. However the use of the transmitted reference signal is inefficient since the power transmitted in the reference signal means less power is transmitted in the data bearing signal. This reduces capacity or, for the same capacity, increases data error rate.

Another aspect of this invention is to not employ a transmitted reference but to achieve "coherent" detection by employing frequency locked and phase locked circuits which do not require a large number of gates.

Matched Filter Examples

The matched filter of the present invention, illustrated in FIGS. 1 and 2, is divided into two or more matched filter sections. The present invention employs two sections. For the cordless phone (CP) ASIC, by way of example, the symbol-matched filter is $N_s$=64 chips long and the frame-matched filter is $N_f$=15 chips long. For the WLL and PCS ASIC, by way of example, the symbol-matched filter is 256 chips long and the frame-matched filter is 32 chips long. The size of the symbol-matched filter determines the number of simultaneous users. It has been found experimentally that the number of simultaneous signals in the DS-CDMA system is approximately $N_s/2$, when using the cascaded matched filter approach diagrammed in FIGS. 1 and 2.

The symbol-matched filter output is noisy and a casual observation does not indicate the instant at which a match occurs when there are many signals present simultaneously. This is illustrated in FIG. 3.

There are 256 possible instants in a 256-stage matched filter, of which only one is correct. To find the correct time and to verify it using the frame-matched filter one can use a "brute force" approach. Assume instant one is correct. Let the output of the symbol-matched filter input the frame-matched filter every 256 chips at times 1, 257, 513, etc. Repeat this; procedure for instants 2, 3, 4, . . . , 256. The averaging by the frame-matched filter matches the number of signals present, and the "noise" appears to be reduced by the size of the frame-matched filter. Thus, in the case of the 256×32 matched filter, the use of 128 signals appears, at the frame-matched filter input, to be the same as only four signals, at the symbol-matched filter output. The acquisition time is then $T_{acq}$=256×256×32/$f_c$=$2^{21}$/$f_c$ which approximately equals $2 \times 10^6/f_c$. If $f_c$=20 MHz then the acquisition time would be approximately 0.1 second.

Figure 5:
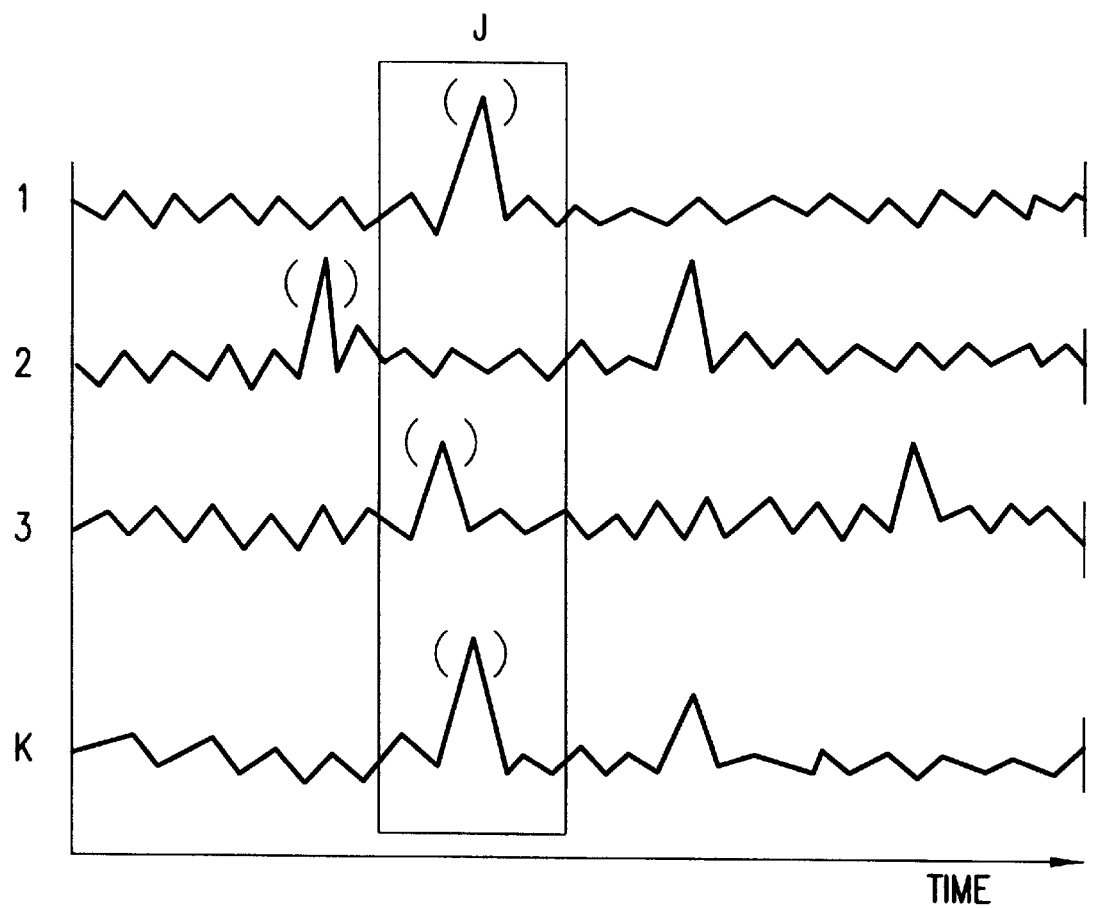
FIG. 5 illustrates an approach to finding a correct time instant at which to measure an output of a symbol-matched filter.

The preferred approach to finding the correct time instant is to measure all 256 symbol-matched filter outputs and record the largest. This procedure is then repeated until a given K number of measurements indicate the same instant, as illustrated in FIG. 5.

In one preferred system, the search is terminated when there are five coincidences. Clearly as one looks for more coincidences the confidence level increases. However, as K increases the acquisition time increases. If K becomes too long, say K=15, then the sampling is assumed to be at the wrong time and the sampling time is adjusted.

After time slot J is selected, the choice is verified using the frame-matched filter. Typically K approximately equals 8, so that the typical acquisition time $T_{acq}$ is 8×256×32/$f_c$=$2^{16}/f_c$ which approximately equals $64 \times 10^3/f_c$. If $f_c$=20 MHz, $T_{acq}$=3 ms, far less than the 100 ms required using "brute force".

Figure 6:
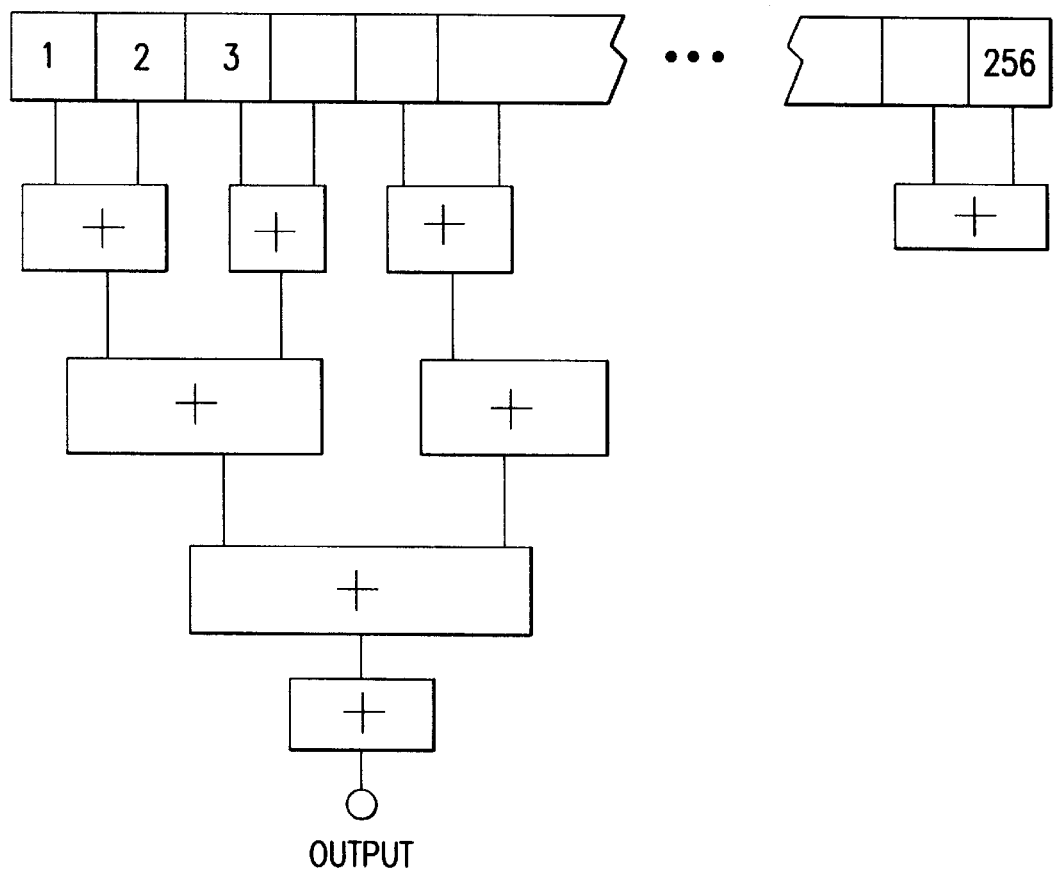
FIG. 6 illustrates a matched filter having register and adder.

The matched filter has a register and adders, as shown in FIG. 6. For the example of 256 registers, row 1 has 128 adders; row 2 has 64; row 3 has 32; etc. Thus a 256 chip matched filter uses 128+64+32+16+8+4+2+1=255 adders. The matched filter uses a symbol-matched filter plus a frame-matched filter, which is equivalent to a 256×32=8192 stage matched. filter which would have 8191 adders. This requirement of 8191 adders is why large matched filters were not built in the prior art. Using the present configuration there are 255+31=286 adders. This is a reduction of almost 30 times.

Sampling

Usually, one samples a signal at the Nyquist rate. Thus, if the chip rate were $f_c$ then one would ordinarily sample each chip twice or at the rate $2f_c$. Hence, if there were 256 chips in a symbol-matched filter, then one would need either two, 256 symbol-matched filters or a single 512-symbol-matched filter, or one would have to reduce the number of symbols to 128 so that the symbol-matched filter equals 256.

Figure 7:
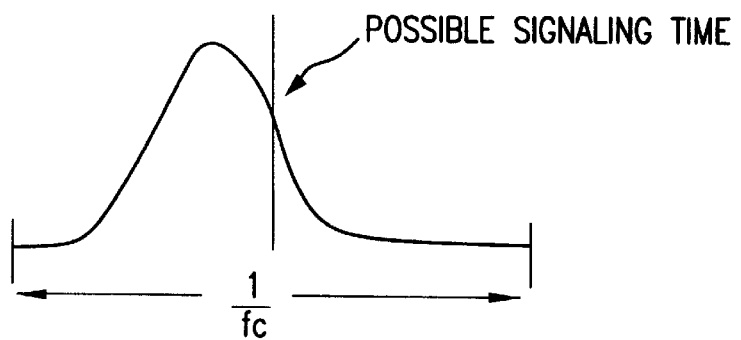
FIG. 7 illustrates a pulse response curve demonstrating that sampling may not occur at a chip peak.

A preferred approach is to sample once per chip. Thus, the sampling rate is $f_c$. The problem with this approach is that the sampling may not occur at the peak of a chip, as illustrated in FIG. 7. This problem is compounded by the fact that the local receiving chip-clock crystal might differ slightly from the chip-clock crystal in the transmitter. As a result of clock mismatch, the sampling instant slides across the chip.

Figure 8:
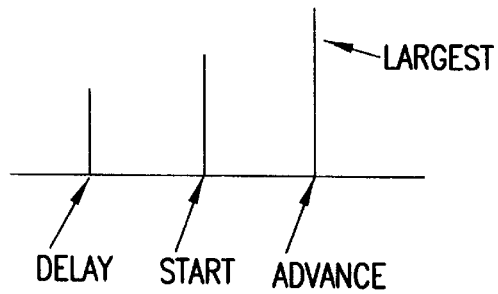
FIGS. 8 and 9 illustrate selection of the correct time to yield the largest output.
Figure 9:
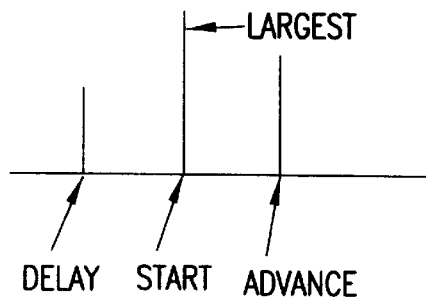

Thus, one aspect of this invention is to ensure that the sampling clock continually samples at or near the peak of each chip. First, if K becomes too long, then the clock phase is shifted by ½ chip. Second, the present invention averages the outputs of the symbol-matched filter $N_F$ times, delays the chip clock by a fraction of a chip, preferably ⅛ chip, and averages the output of the symbol-matched filter, $N_F$ times. Then the chip clock is advanced by ⅛ chip and again the symbol-matched filter output is averaged $N_F$ times. The timing selected is thaws which yields the largest output. This process is continually repeated, as illustrated in FIGS. 8 and 9.

Thus, for $N_F$=32 a trial takes 3×256×32/$f_c$ which approximately equals 25,000/$f_c$. If $f_c$=20 MHz, a trial takes 1 ms.

Frequency and Phase Locking

The transmitter and receiver RF crystal frequencies usually differ. Differences of 20 kHz are possible. In addition, the incoming signal undergoes a Doppler shift due to the fact that the transmitter and/or receiver may be in motion. The Doppler shift usually is not larger than 300 Hz at a center frequency of 2 GHz.

In order to use coherent detection without a pilot transmitted reference, the phase as well as the frequency of the transmit and receiver oscillators must be locked. The frequency locked loop/phase locked loop are in general well known concepts. Our implementation is discussed in a separate patent application.

Packet Structure

Figure 10:
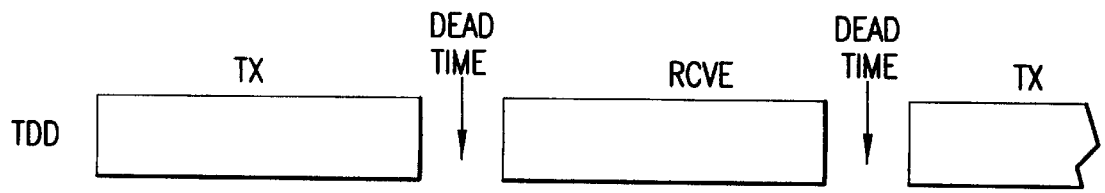
FIG. 10 illustrates an example of packets for time division duplex.

There are two possible modes of operation: time-division duplex (TDD) and frequency-division duplex (FDD). The time-division duplex can be used for the CP ASIC. The frequency-division duplex can be used for the WLL and PCS ASIC since higher data rates are needed for WLL and PCS applications. Using time-division duplex effectively doubles the data rate. FIG. 10 illustrates an example of packets for time division duplex.

Figure 11:
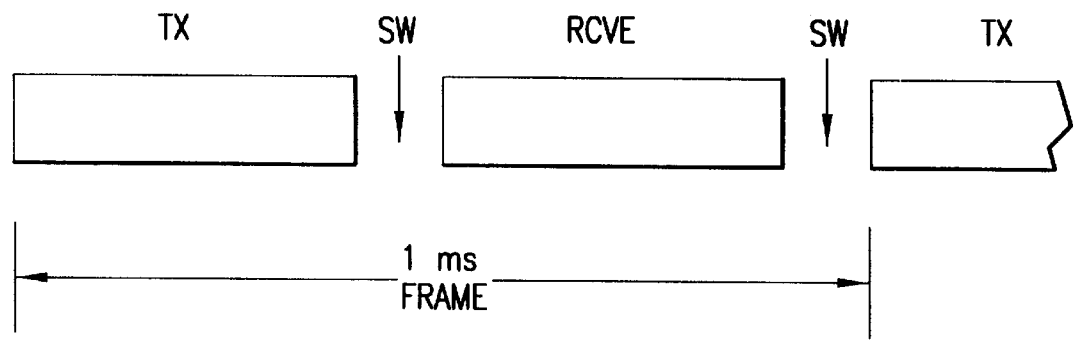
FIG. 11 illustrates switch time.

Dead time is used for switching from transmit (TX) mode to receive (RCVE) mode, and vice versa as illustrated in FIG. 11. In this example, $f_c$=10.368 MHz (required by adaptive delta pulse code modulation (ADPCM)). The symbol-matched filter 64 chips=1 symbol=1 bit and the frame time is $T_{frame}$=1 ms.

In 1 ms there are 10,368 chips which equals 162 symbols, which equals 162 bits. In 1 ms there are 32 bits of voice at 32 kb/s.

15 symbols = header which is detected by a 15-stage frame-matched filter

1–2 symbols = APC

1–2 symbols = signaling 32 symbols = voice (assuming 32 kb/s is used)

1 symbols = do not care, used to compensate for propagation delay 21 symbols = CRC 73 symbols The receive packet duration is equal to the transmit packet duration.

The switch (SW) times, shown in FIG. 11, are needed to switch the RF from the TX mode to the RCVE mode and vice versa. Approximately 50 microseconds are needed. An embodiment of the present invention uses 8 symbols.

73 symbols TX
73 symbols RCVE
8 SW
8 SW
162 symbols/frame

Frequency Division Duplex

Figure 12:
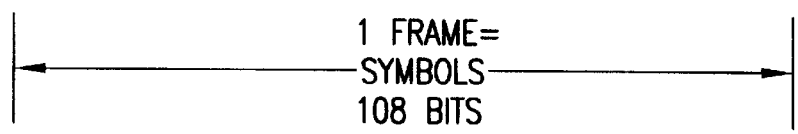
FIGS. 12–20 illustrate frequency division duplex examples.
Figure 13:
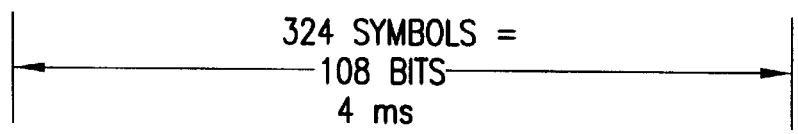

An example of a FDD packet is
10.368 MHz=ADPCd clock
20.736 Mchips/s=$f_c$=chip clock
256 chips/symbol in symbol-matched filter
81 symbols/ms
Assume: 1 Frame=4ms=324 symbols Each frame contains 32 symbols: Header
2 kb/s: signaling
2 kb/s: APC
Data+CRC
As shown in FIG. 12 for 16 kb/s,
16+2+2=20 kb/s=80 bits/4ms frame
Let 1 bit=3 symbols
240 symbols of data, sig & APC/frame symbols of header 32
---
267
+ 52 CRC
---
324 total spread APC bits, 3 at a time, uniformly over packet As shown in FIG. 13 for 32 kb/s, 32+2+2=36 kb/s=144 bits/4ms Let 1 bit=2 symbols 288
+ 32
---
320
+ 4 CRC symbols
---
324

Figure 14:
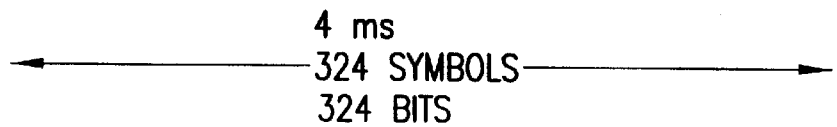
Figure 14:
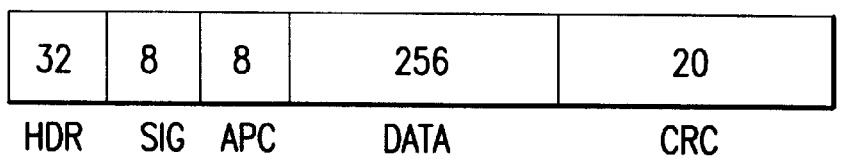

As shown in FIG. 14, for 64 kb/s,

64+2+2=68 kb/s=272 bits/4ms

Let 1 bit=1 symbol

272
+ 32
---
304
+ 20 CRC symbols
---
324

Figure 15:
Figure 15:
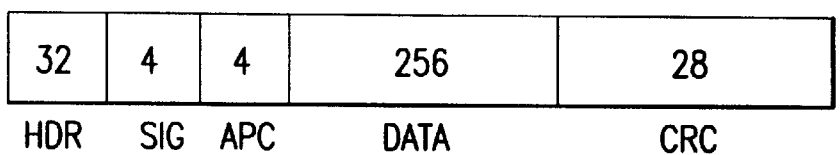

As shown in FIG. 15, for 128 kb/s,

128+2+2=132 kb/ms=528 bits/4ms

Let 1 bit=½ symbol

264
+ 32
---
296
+ 28 CRC symbols
---
324

Figure 16:
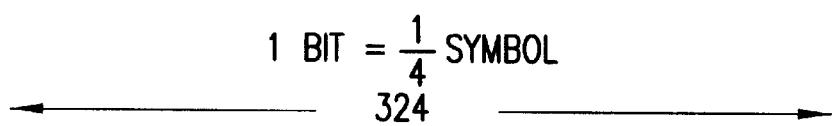
Figure 16:
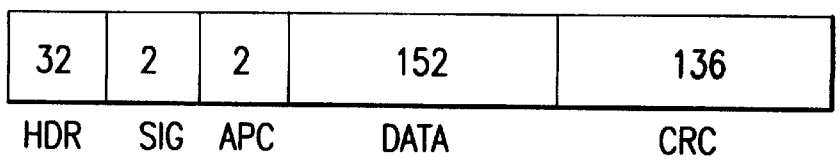

As shown in FIG. 16, for ISDN, 152 kb/s,

152+2+2=156 bits/ms=624 bits/4ms

Let 1 bit=¼ symbol

156
+ 32
---
188
+ 136 CRC symbols
---
324

Figure 17:
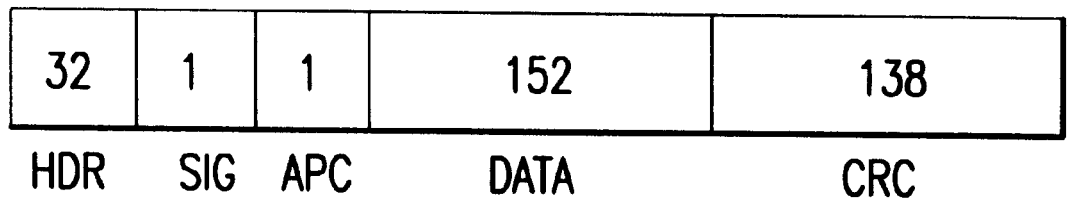

As shown in FIG. 17, for 304 kb/s,

304+2+2=308 bits/ms=1232 bits/4ms

Let 1 bit=⅛ symbol

154
+ 32
---
186
+ 138 CRC symbols
---
324

Figure 18:
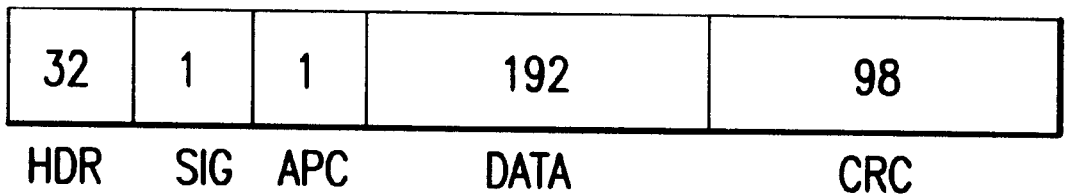

As shown in FIG. 18, for 384 kb/s,

384+2+2=388 bits/ms=1552 bits/4ms

Let 1 bit=⅛ symbol

```
  194
+  32
─────
  226
+  98   CRC symbols
─────
  324
```

Figure 19:
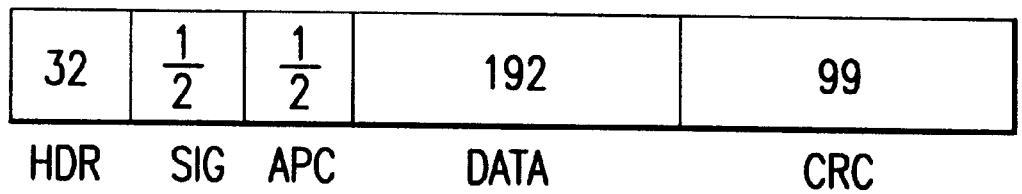

As shown in FIG. 19, for 768 kb/s,
768+2+2=772 bits/ms=3088 bits/4ms
Let 1 bit=1/16 symbol

```
  193
+  32
─────
  225
+  99   CRC symbols
─────
  324
```

Figure 20:
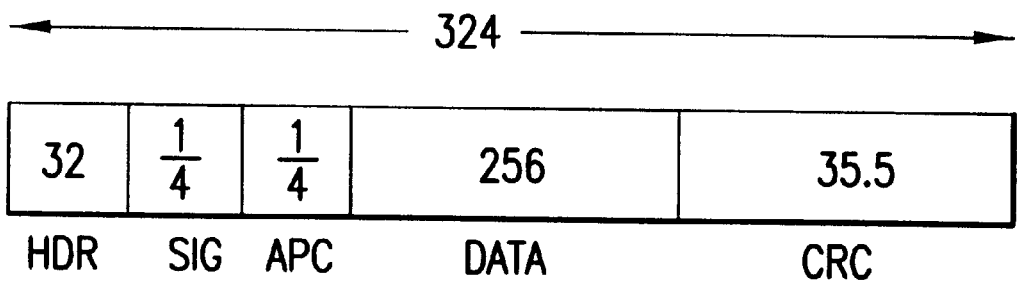

As shown in FIG. 20, for 2.048 mchips/sec,
2048+2+2=2052 bits/ms=4104 bits/4ms
Let 1 bit=1/32 symbol

```
   256
    32
  +0.5
 ─────
 288.5
+ 35.5   CRC symbols
 ─────
   324
```

At higher data rates, the power is increased so that $Eb/N_o$ is constant.

Figure 21:
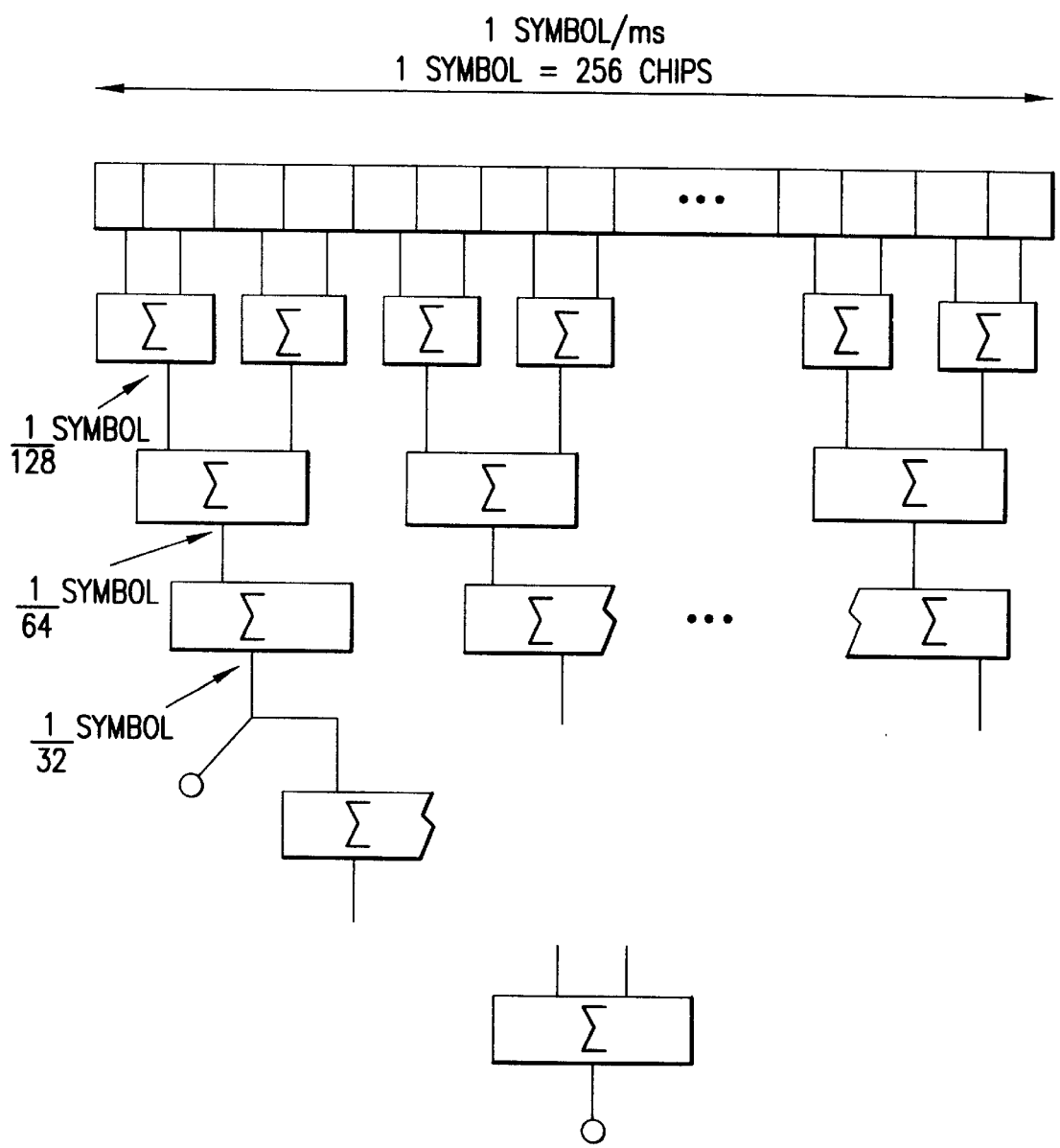
FIG. 21 illustrates adder gates.

As shown in FIG. 21, one has access to a fraction of a symbol. Thus, a chip clock and a symbol clock are required.
Demodulation If phase varies due to Doppler or oscillator offset, then if the phase variation were small between adjacent bits, differential demodulation can be used.

Since the data d(t) suffers periodic sign changes due to phase variation, and d(t) and $d(t-T_b)$, which are adjacent bits, frequently suffer the same sign changes since the phase variation between them is small, b(t) can represent the differentially decoded data stream. Differential encoding must be used. If there were no phase variation, then b(t) has twice the error of d(t); see Taub and Schilling, PRINCIPLES OF COMMUNICATION SYSTEMS.

Thus, frequency and phase are locked to the best of ability, and differential decoding is used to compensate for estimation inaccuracies. If the frequency locking were perfect so that the phase were consistent, then coherent detection occurs and the error rate increases by a factor of two.

In the CP, 1 bit=1 symbol, so that the output of the 64 symbol-matched filter is the bit stream shown in the packet.

In the WLL & DCS chip, at low data rates, 1 bit is equal to 2 or more symbols. In that case the symbols are added prior to differential decoding. High data rates use less than 1 symbol.

Phase-Locked-Loop Apparatus

The spread-spectrum, phase-locked-loop apparatus, for use as part of the spread-spectrum receiver on a received-spread-spectrum signal, includes symbol-matched means, a voltage-controlled oscillator, first product means, second product means, third product means, fourth product means, fifth product means, first combining means, and second combining means. The symbol-matched means may further include an in-phase-symbol-matched means and a quadrature-phase-symbol-matched means for processing an in-phase signal and a quadrature-phase signal.

The first product means is coupled to the in-phase-symbol-matched means and to the voltage-controlled oscillator. The second product means is coupled to the in-phase-symbol-matched means and to the voltage-controlled oscillator. The third product means is coupled to the quadrature-phase-symbol-matched means and to the voltage-controlled oscillator. The fourth product means is coupled to the quadrature-phase-symbol-matched means and to the voltage-controlled oscillator. The first combining means is coupled to the first product means and to the third product means. The second combining means is coupled to the second product means and to the fourth product means. The fifth product means is coupled to the first combining means and to the second combining means, and to the voltage-controlled oscillator.

The in-phase-symbol-matched means has an in-phase-symbol-impulse response set or matched to the chip-sequence signal. The quadrature-phase-symbol-matched means has an impulse response matched to the chip-sequence signal. Matching the impulse responses of the in-phase-symbol-matched means and the quadrature-phase-symbol-matched means to the chip-sequence signal may be set by a controller and adder gates, as previously discussed. Code means coupled to the in-phase-symbol-matched means and to the quadrature-phase-symbol-matched means may be used to generate a replica of the chip-sequence signal.

The in-phase-symbol-matched means despreads from the received-spread-spectrum signal, an in-phase component of the received spread-spectrum signal, as a despread-in-phase component of a symbol-sequence signal. The quadrature-phase-symbol-matched means despreads from the received spread-spectrum signal, a quadrature-phase component from the received spread-spectrum signal as a despread-quadrature-phase component of the symbol-sequence signal. The voltage-controlled oscillator (VCO) generates a VCO-sine signal and a VCO-cosine signal. The VCO-cosine signal has a phase relationship which is 90° from the VCO-sine signal.

The first product means multiplies the despread-in-phase component of the symbol-sequence signal by the VCO-cosine signal, to generate a first product signal. The second product means multiplies the despread-in-phase component of the symbol-sequence signal by the VCO-sine signal, to generate a second product signal. The third product means multiplies the despread-quadrature-phase component of the symbol-sequence signal by the VCO-sine signal, to generate a third product signal. The fourth product means multiplies the despread-quadrature-phase component of the symbol-sequence signal by the VCO-cosine signal, to generate a fourth product signal.

The symbol-sequence signal may include a plurality of packets, with each packet having a header-sequence signal and a data-symbol-sequence signal, as previously discussed. Alternatively, the present invention may be used with a continuous spread-spectrum signal, having an equivalent timing marker or data blocks, as previously mentioned. Other types of signals having a block or frame structure with block or frame markers would be equivalent to the header embodiment discussed herein. Use of a header is advantageous as the header indicates the start of data, aids in acquisition and reacquisition, and helps provide phase reference between multipaths for diversity combining such as RAKE.

For a packeted spread-spectrum signal, the in-phase-symbol-matched means, when despreading a packet from the plurality of packets, despreads from the received-spread-spectrum an in-phase component of the packet as a despread-in-phase component of a header-symbol-sequence signal and an in-phase component of the packet as a despread-in-phase component of the data-symbol-sequence signal. The quadrature-phase-.symbol-matched filter despreads from the received-spread-spectrum signal, a quadrature-phase component of the packet as a despread-quadrature-phase component of the header-symbol-sequence signal and a quadrature-phase component of the packet as a despread-quadrature-phase component of the data-symbol-sequence signal.

For a packet or non-packet spread-spectrum signal, the first combining means combines the first product signal with the third product signal, to generate a first combined signal. The second combining means combines the second product signal with the fourth product signal, to generate a second combined signal. The fifth product means multiplies the first combined signal by the second combined signal, to generate an error signal.

In response to the error signal, the voltage-controlled oscillator adjusts a level of the VCO-sine signal and a level of the VCO-cosine signal.

Figure 22:
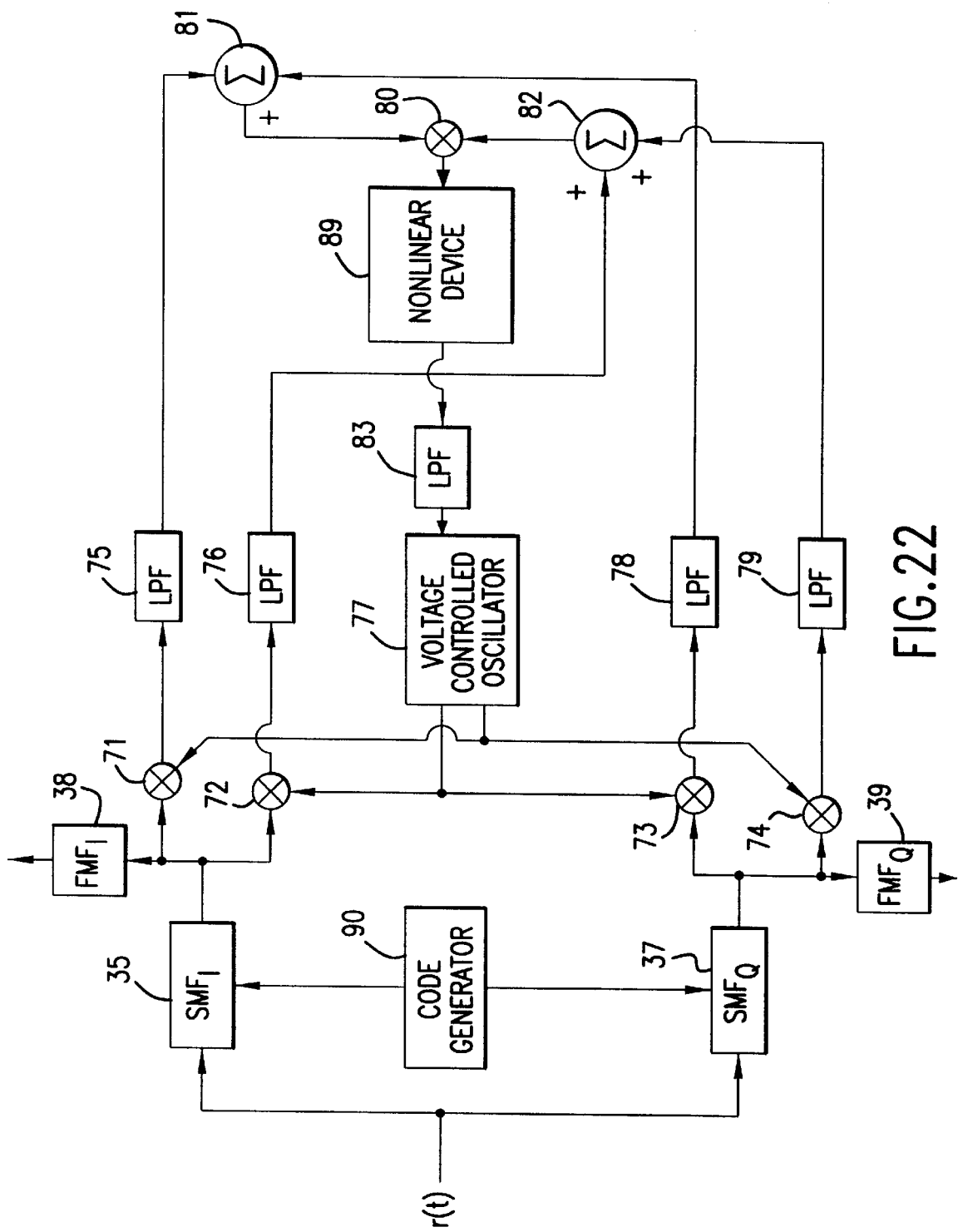
FIG. 22 illustrates a phase-locked loop circuit for use with the symbol-matched filter.

In the exemplary arrangement shown in FIG. 22, the symbol-matched means may be embodied as an in-phase-symbol-matched filter 35 and a quadrature-phase-symbol-matched filter 37. The in-phase-symbol-matched means is shown as a in-phase-symbol-matched filter 35, and the quadrature-phase-symbol-matched means is shown as a quadrature-phase-symbol-matched filter 37. The symbol-matched means may also be embodied as a correlator or other equivalent device as is well-known by those skilled in the art. Code means, while not required for the present invention, is shown as a code generator 90. The first product means, the second product means, the third product means, the fourth product means, and the fifth product means are shown as a first product device 71, a second product device 72, a third product device 73, a fourth product device 74, and a fifth product device 80, respectively. The first combining means and the second combining means are shown as a first combiner 81 and a second combiner 82, respectively.

The first product device 71 is coupled to the in-phase-symbol-matched filter 35 and to the voltage-controlled oscillator 77, and the second product device 72 is coupled to the in-phase-symbol-matched filter 35 and to the voltage-controlled oscillator 77. The third product device 73 is coupled to the quadrature-phase-symbol-matched filter 37 and to the voltage-controlled oscillator 77, and the fourth product device 74 is coupled to the quadrature-phase-symbol-matched filter 37 and to the voltage-controlled oscillator 77. The first combiner 81 is coupled through a lowpass filter 75 to the first product device 71 and through a lowpass filter 78 to the third product device 73. The second combiner 82 is coupled through a lowpass filter 76 to the second product device 72 and through a lowpass filter 79 to the fourth product device 74. The fifth product device 80 is coupled to the first combiner 81 and to the second combiner 82, and to the voltage-controlled oscillator 77 through a lowpass filter 83.

Optionally, a nonlinear device 89 may be employed to speed up the response in the phase-locked-loop circuit. As shown in FIG. 22, the nonlinear device is coupled to the fifth product device 80 and to the voltage-controlled oscillator 77 through the lowpass filter 83.

The spread-spectrum-matched filter apparatus may further comprise in-phase-frame matched means and quadrature-phase frame-matched means. As shown in FIG. 22, the in-phase-frame matched means may be embodied as an in-phase-frame-matched filter 38. The quadrature-phase-frame-matched means may be embodied as a quadrature-phase-frame-matched filter 39. The in-phase-frame-matched filter 39 has an in-phase-frame-impulse response matched to an in-phase component of the header-symbol-sequence signal for generating an in-phase-time-reference signal for use in a signal in response to the in-phase component of the despread-header-symbol-sequence signal matching the in-phase-frame-impulse response. The quadrature-phase-frame-matched filter 39 has a quadrature-phase-frame-impulse response matched to a quadrature-phase component of the header-symbol-sequence signal for generating a quadrature-phase-time-reference signal for use in a signal in response to the quadrature-phase component of the despread-header-symbol-sequence signal matching the quadrature-phase-frame-impulse response. The in-phase-time-reference signal may include an in-phase-data-start signal. The quadrature-phase-time-reference signal may include a quadrature-phase-data-start signal. Further discussion of the frame-matched means was provided in connection with the matched filter discussed earlier and is incorporated herein by reference.

The in-phase-frame-matched means may also be embodied as an in-phase-frame-digital-matched filter. The quadrature-phase-frame-matched means may also be embodied as a quadrature-phase-frame-digital-matched filter.

The symbol-matched means has an in-phase-symbol-impulse response matched to the chip-sequence signal and a quadrature-symbol-impulse response matched to the chip-sequence signal. Code means may be used to generate a replica of the chip-sequence signal. The symbol-matched means despreads, from the received-spread-spectrum signal, an in-phase component as a despread-in-phase component of a symbol-sequence signal, $d_I(t)$, and a quadrature-phase component as a despread-quadrature-phase component of a symbol-sequence signal, $d_Q(t)$. The received-spread-spectrum signal is assumed to have an arbitrary phase angle, $\theta(t)$. Thus, at baseband, the despread- in-phase component may be represented by $d_I(t)=d(t)\cos\{\theta(t)\}$, and the despread-quadrature-phase component may be represented by $d_Q(t) =d(t)\sin\{\theta(t)\}$.

The voltage-controlled oscillator 77 generates a VCO-sine signal, $\sin\{\phi(t)\}$ and a VCO-cosine signal, $\cos\{\phi(t)\}$. The VCO-cosine signal has a phase which is 90° from the VCO-sine signal.

The first product device 71 multiplies the despread-in-phase component of the symbol-sequence signal, $d_I(t)$, by the voltage VCO-cosine signal, $\cos\{\phi(t)\}$, to generate a first product signal $d_I(t)\cos\{\phi(t)\}$. The second product device 72 multiplies the despread-in-phase component of the symbol-sequence signal, $d_I(t)$, by the VCO-sine signal, $\sin\{\phi(t)\}$, to generate a second product signal, $d_I(t)\sin\{\phi(t)\}$. The third product device 73 multiplies the despread-quadrature-phase component of the symbol-sequence signal, $d_Q(t)$ by the VCO-sine signal to generate a third product signal, $d_Q(t)\sin\{\phi(t)\}$. The fourth product device 74 multiplies the despread-quadrature-phase component of the symbol-sequence signal by the VCO-cosine signal, thereby generating a fourth product signal, $d_Q(t)\cos\{\phi(t)\}$.

The first combiner 81 combines the first product signal with the third product signal, to generate a first combined signal. The first product signal is inverted when combined with the third product signal. The lowpass filter 75 passes the lower frequency components of the first product signal, and the lowpass filter 78 passes the lower frequency components of the third product signal. The second combiner 82 combines the second product signal with the fourth product signal, to generate a second combined signal. The lowpass filter 76 passes the low frequency components of the second product signal, and the lowpass filter 79 passes the low frequency components of the fourth product signal. The fifth product device 80 multiplies the first combined signal by the second combined signal to generate an error signal, $e(t) = \sin 2\{\theta(t) - \phi(t)\}$. In response to the error signal, $e(t)$, the voltage-controlled oscillator 77 adjusts a level of the VCO-sine signal and a level of the VCO-cosine signal. The lowpass filter 83 passes only the lower frequency components of the error signal to the voltage-controlled oscillator 77.

Digitally, for an $i^{th}$ sample, the despread-in-phase component of a symbol-sequence signal is represented as:

$$d_{Ii} = D_i \cos\{\theta_i\}$$

The despread-quadrature-phase component of a symbol-sequence signal is represented as:

$$d_{Qi} = d_i \sin\{\theta_i\}$$

Accordingly, the first product signal is represented as:

$$d_i \cos\{\theta_i\} \cos\{\phi_i\};$$

the second product signal is represented as:

$$d_i \cos\{\theta_i\} \sin\{\phi_i\};$$

the third product signal is represented as:

$$d_i \sin\{\theta_i\} \sin\{\phi_i\}$$

and the fourth product signal is represented as $$d_i \sin\{\theta_i\} \cos\{\phi_i\}.$$

Thus, the first combined signal is $d_i \cos\{\theta_i - \phi_i\}$ and the second combined signal is $d_i \sin\{\theta_i - \phi_i\}$. These values yield the error signal as $e_i = \sin\{2(\theta_i - \phi_i)\}$.

The phase-locked-loop apparatus forces the phase $\phi_i$ of the digital voltage-controlled oscillator 77 to closely follow and try to equal the incoming varying phase $\theta_i$. When $\phi_i = \theta_i$, the steady state is reached and the digital lowpass filter preceding the voltage-controlled oscillator is zero.

The two outputs of the voltage-controlled oscillator 77, the VCO-sine signal, $\sin\{\phi_i\}$, and the VCO-cosine signal, $\cos\{\phi_i\}$, then represent the coherent reference and the demodulated data is $$\hat{d} = d_{Ii} \sin\{\phi_i\} + d_{Qi} \cos\{\phi_i\}$$

This is true since $d_{Ii} = d_i \sin\{\theta i\}$ and $d_{Qi} = d_i \cos\{\theta_i\}$ and $\theta_i = \phi_i$. Hence $d = r(t)$ is the output of the symbol-matched means. Depending on the data rate, $d_I$ and $d_Q$ may be a fraction of the symbol-matched means. Thus $r(t)$ is a filtered version, as done by the symbol-matched means, of $d(t)$.

An alternative embodiment of the present invention also includes a spread-spectrum-phase-locked-loop method, for use as part of a spread-spectrum receiver on the received-spread-spectrum signal. The received spread-spectrum signal, having an arbitrary phase $\theta(t)$, is generated from spread-spectrum processing a symbol-sequence signal with a chip-sequence signal. The method comprises the steps of despreading, from the received-spread-spectrum signal, an in-phase component as a despread-in-phase component of a symbol-sequence signal, $d_I(t)$, and despreading, from the received-spread-spectrum signal, a quadrature-phase component as a despread quadrature-phase component of the symbol-sequence signal, $d_Q(t)$. The step of despreading may be performed using a matched filter, a correlator, or any other equivalent circuitry as is well known in the art.

The method further includes generating from a voltage-controlled-oscillator (VCO), a VCO-sine signal, $\sin\{\phi(t)\}$, and a VCO-cosine signal, $\cos\{\phi(t)\}$. The VCO-cosine signal has a phase relationship which is 90° from the VCO-sine signal.

The despread-in-phase component of the symbol-sequence signal is multiplied by the VCO-cosine signal, to generate a first product signal, $d_I(t)\cos\{\phi(t)\}$. The despread-in-phase component of the symbol-sequence signal is multiplied by the VCO-sine signal, to generate a second product signal, $d_I(t)\sin\{\phi(t)\}$. The despread-quadrature-phase component of the symbol-sequence signal is multiplied by the VCO-sine signal, to generate a third product signal, $d_Q(t)\sin\{\phi(t)\}$. The despread-quadrature-phase component of the symbol-sequence signal is multiplied by the VCO-cosine signal, to generate a fourth product signal, $d_Q(t)\cos\{\phi(t)\}$.

An inverse of the first product signal is combined with the third product signal to generate a first combined signal, and the second product signal is combined with the fourth product signal to generate a second combined signal.

The method further includes multiplying the first combined signal by the second combined signal to generate an error signal, $e(t)$, and adjusting, in response to the error signal, a level of the VCO-sine signal and a level of the VCO-cosine signal.

It will be apparent to those skilled in the art that various modifications can be made to the spread-spectrum-matched-filter and phase-locked-loop apparatus of the instant invention without departing from the scope or spirit of the invention, and it is intended that the present invention cover modifications and variations of the spread-spectrum-matched-filter and phase-locked-loop apparatus provided they come within the scope of the appended claims and their equivalents.

We claim:

1. A spread-spectrum-phase-locked-loop apparatus, for use as part of a spread-spectrum receiver on a received-spread-spectrum signal having a plurality of packets, each of said plurality of packets generated from spread-spectrum processing a header-symbol-sequence signal with a chip-sequence signal and from spread-spectrum processing a data-symbol-sequence signal with the chip-sequence signal, comprising:

code means for generating a replica of the chip-sequence signal;

in-phase-symbol-matched means, coupled to said code means, responsive to having an in-phase-symbol-impulse response set from a replica of the chip-sequence signal generated by said code means, for despreading from the received-spread-spectrum signal, an in-phase component of a packet from the plurality of packets as a despread-in-phase component of a header-symbol-sequence signal, and responsive to having the in-phase-symbol-impulse response set from the replica of the chip-sequence signal generated by said code means, for despreading from the received-spread-spectrum signal, an in-phase component of the packet as a despread-in-phase component of a data-symbol-sequence signal;

quadrature-phase-symbol-matched means, coupled to said code means, responsive to having a quadrature-symbol-impulse response set from the replica of the chip-sequence signal generated by said code means, for despreading from the received-spread-spectrum signal, a quadrature-phase component of the packet as a despread-quadrature-phase component of a header-symbol-sequence signal, and responsive to having the quadrature-symbol-impulse response set from the replica of the chip-sequence signal generated by said code means, for despreading from the received-spread-spectrum signal, a quadrature-phase component of the packet as a despread-quadrature-phase component of the data-symbol-sequence signal;

a voltage-controlled oscillator (VCO) for generating a VCO-sine signal and a VCO-cosine signal, with the VCO-cosine signal having a phase 90° from the VCO-sine signal;

first product means, coupled to said in-phase-symbol-matched means and to said voltage-controlled oscillator, for multiplying the despread-in-phase component of any of the header-symbol-sequence signal and the data-symbol-sequence signal, by the VCO-cosine signal thereby generating a first product signal;

second product means, coupled to said in-phase-symbol-matched means and to said voltage-controlled oscillator, for multiplying the despread-in-phase component of any of the header-symbol-sequence signal and the data-symbol-sequence signal, by the VCO-sine signal thereby generating a second product signal;

third product means, coupled to said quadrature-phase-symbol-matched means and to said voltage-controlled oscillator, for multiplying the despread-quadrature-phase component of any of the header-symbol-sequence signal and the data-symbol-sequence signal, by the VCO-sine signal, thereby generating a third product signal;

fourth product means, coupled to said quadrature-phase-symbol-matched means and to said voltage-controlled oscillator, for multiplying the despread-quadrature-phase component of any of the header-symbol-sequence signal and the data-symbol-sequence signal, by the VCO-cosine signal, thereby generating a fourth product signal;

first combining means, coupled to said first product means and to said third product means, for combining the first product signal with the third product signal, thereby generating a first combined signal;

second combining means, coupled to said second product means and to said fourth product means, for combining the second product signal with the fourth product signal, thereby generating a second combining signal;

fifth product means, coupled to said first combining means and to said second combining means, for multiplying the first combined signal by the second combined signal, thereby generating an error signal;

a non linear device, coupled between said fifth product means and said voltage-controlled oscillator, for speeding up response in the spread-spectrum-phase-locked-loop apparatus; and wherein said voltage-controlled oscillator, responsive to the error signal, adjusts a level of the VCO-sine signal and a level of the VCO-cosine signal.

2. A spread-spectrum-phase-locked-loop apparatus, for use as part of a spread-spectrum receiver on a received-spread-spectrum signal generated from spread-spectrum processing a symbol-sequence signal with a chip-sequence signal, comprising:

in-phase-symbol-matched means, responsive to having an in-phase-symbol-impulse response matched to the chip-sequence signal, for despreading from the received-spread-spectrum signal, an in-phase component as a despread-in-phase component of a symbol-sequence signal;

quadrature-phase-symbol-matched means, responsive to having a quadrature-symbol-impulse response matched to the chip-sequence signal, for despreading from the received-spread-spectrum signal, a quadrature-phase component as a despread-quadrature-phase component of the symbol-sequence signal;

a voltage-controlled oscillator (VCO), coupled to said in-phase-symbol-matched means and to said quadrature-phase-symbol-matched means, for generating a VCO-sine signal and a VCO-cosine signal, with the VCO-cosine signal having a phase 90° from the VCO-sine signal;

first product means, coupled to said in-phase-symbol-matched means and to said voltage-controlled oscillator, for multiplying the despread-in-phase component of the symbol-sequence signal by the VCO-cosine signal, thereby generating a first product signal;

second product means, coupled to said in-phase-symbol-matched means and to said voltage-controlled oscillator, for multiplying the despread-in-phase component of the symbol-sequence signal by the VCO-sine signal, thereby generating a second product signal;

third product means, coupled to said quadrature-phase-symbol-matched means and to said voltage-controlled oscillator, for multiplying the despread-quadrature-phase component of the symbol-sequence signal by the VCO-sine signal, thereby generating a third product signal;

fourth product means, coupled to said quadrature-phase-symbol-matched means and to said voltage-controlled oscillator, for multiplying the despread-quadrature-phase component of the symbol-sequence signal by the VCO-cosine signal, thereby generating a fourth product signal;

first combining means, coupled to said first product means and to said third product means, for combining the first product signal with the third product signal, thereby generating a first combined signal;

second combining means, coupled to said second product means and to said fourth product means, for combining the second product signal with the fourth product signal, thereby generating a second combining signal;

fifth product means, coupled to said first combining means and to said second combining means, for multiplying the first combined signal by the second combined signal, thereby generating an error signal;

a non linear device, coupled between said fifth product means and said voltage-controlled oscillator, for speeding up response in the spread-spectrum-phase-locked-loop apparatus; and wherein said voltage-controlled oscillator, responsive to the error signal, adjusts a level of the VCO-sine signal and a level of the VCO-cosine signal.

3. The spread-spectrum-phase-locked-loop apparatus as set forth in claim 1 or 2 further comprising:

in-phase-frame-matched means having an in-phase-frame-impulse response matched to an in-phase component of the header-symbol-sequence signal for generating an in-phase-time-reference signal for use in a signal in response to the in-phase component of the despread-header-symbol-sequence signal matching the in-phase-frame-impulse response; and quadrature-phase-frame-matched means having a quadrature-phase-frame-impulse response matched to a quadrature-phase component of the header-symbol-sequence signal for generating a quadrature-phase-time-reference signal for use in a signal in response to the quadrature-phase component of the despread-header-symbol-sequence signal matching the quadrature-phase-frame-impulse response.

* * * * *